US010627476B2

(12) United States Patent
Nakamura et al.

(10) Patent No.: US 10,627,476 B2
(45) Date of Patent: Apr. 21, 2020

(54) INFORMATION PROCESSING SYSTEM, INFORMATION PROCESSING APPARATUS, AND INFORMATION PROCESSING METHOD

(71) Applicant: FUJITSU LIMITED, Kawasaki-shi, Kanagawa (JP)

(72) Inventors: Yosuke Nakamura, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 15/715,209

(22) Filed: Sep. 26, 2017

(65) Prior Publication Data
US 2018/0149726 A1    May 31, 2018

(30) Foreign Application Priority Data

Nov. 25, 2016   (JP) ................................. 2016-229209

(51) Int. Cl.
*G01S 5/02*   (2010.01)
*H04W 64/00*   (2009.01)
(Continued)

(52) U.S. Cl.
CPC ............... *G01S 5/0252* (2013.01); *G01S 1/68* (2013.01); *H04W 4/70* (2018.02); *H04W 8/22* (2013.01); *H04W 64/00* (2013.01); *H04W 88/16* (2013.01)

(58) Field of Classification Search
CPC ........ G01S 1/68; G01S 5/0252; G01S 5/0242; G01S 5/0221; H04W 8/22; H04W 4/005;
(Continued)

(56) References Cited

U.S. PATENT DOCUMENTS 5,095,500 A * 3/1992 Tayloe .................. H04W 24/00
                                                    379/32.01
6,236,335 B1 * 5/2001 Goodwin, III ........ G01S 5/0252
                                                    340/8.1
(Continued)

FOREIGN PATENT DOCUMENTS

JP    2001-013243    1/2001
JP    2011-017684    1/2011
(Continued)

OTHER PUBLICATIONS

Extended European Search Report for corresponding European Patent Application No. 17192772.6, dated Apr. 20, 2018.
(Continued)

*Primary Examiner* — Edward F Urban
*Assistant Examiner* — Rui M Hu
(74) *Attorney, Agent, or Firm* — Staas & Halsey LLP

(57) ABSTRACT

An information processing system is disclosed. A device conducts a predetermined process by sensing a neighboring radio signal state. An information processing apparatus is connected to the device. In the information processing apparatus, multiple sets of neighboring definition information in which a neighboring signal state is defined, is stored in a storage part. Neighboring definition information depending on a location indicated by location information is specified from among the multiple sets of neighboring definition information based on the location information received from the device. The specified neighboring definition information is sent to the device. In the device, the predetermined process using the neighboring information received from the information processing apparatus is conducted. Sensing information indicating a process result acquired by the predetermined process is generated.

7 Claims, 26 Drawing Sheets

(51) Int. Cl.
*H04W 4/70* (2018.01)
*G01S 1/68* (2006.01)
*H04W 8/22* (2009.01)
*H04W 88/16* (2009.01)

(58) Field of Classification Search
CPC . H04W 4/70; H04W 64/00–006; H04B 17/27
USPC .......................... 455/517, 456.1–457, 404.2
See application file for complete search history.

(56) References Cited

U.S. PATENT DOCUMENTS

| | | | | |
|---|---|---|---|---|
| 6,574,478 | B1* | 6/2003 | Mortensen | G01S 5/06 455/11.1 |
| 6,574,482 | B1* | 6/2003 | Radomsky | A61B 5/1113 455/517 |
| 7,072,669 | B1* | 7/2006 | Duckworth | G01S 5/0215 455/404.2 |
| 7,116,988 | B2* | 10/2006 | Dietrich | G01S 5/0221 455/456.1 |
| 7,312,752 | B2* | 12/2007 | Smith | G01S 5/021 342/464 |
| 7,742,456 | B2* | 6/2010 | Kawaguchi | H04W 64/00 370/338 |
| 7,848,766 | B2* | 12/2010 | Ogino | H04W 64/00 455/456.1 |
| 7,966,021 | B2* | 6/2011 | Dietrich | H04W 64/00 455/456.1 |
| 8,155,662 | B2* | 4/2012 | Zill | G01S 5/02 455/423 |
| 8,229,457 | B2* | 7/2012 | Shen | G01S 5/12 342/450 |
| 8,346,281 | B2* | 1/2013 | Noonan | H04W 48/04 455/456.1 |
| 8,433,334 | B2* | 4/2013 | Huang | G01S 5/02 455/456.1 |
| 8,725,167 | B2* | 5/2014 | Sionnina; Lana | G01S 5/0036 455/456.1 |
| 8,725,182 | B2* | 5/2014 | Jen | H04W 64/00 340/539.13 |
| 8,825,078 | B1* | 9/2014 | Mishra | H04W 64/003 455/456.1 |
| 8,831,594 | B2* | 9/2014 | Naguib | G01S 5/021 455/424 |
| 2003/0043073 | A1* | 3/2003 | Gray | G01S 5/0215 342/465 |
| 2003/0063589 | A1* | 4/2003 | Haines | H04W 64/00 370/338 |
| 2005/0003828 | A1* | 1/2005 | Sugar | H04W 24/00 455/456.1 |
| 2005/0090266 | A1 | 4/2005 | Sheynblat | |
| 2006/0240840 | A1* | 10/2006 | Morgan | G01S 5/02 455/456.1 |
| 2007/0032248 | A1* | 2/2007 | Ogino | H04W 64/00 455/456.1 |
| 2007/0104157 | A1* | 5/2007 | Kawaguchi | H04W 64/00 370/338 |
| 2009/0003490 | A1* | 1/2009 | Nadler | H04W 64/00 375/316 |
| 2009/0059867 | A1* | 3/2009 | Rajasimman | H04W 16/32 370/332 |
| 2009/0143080 | A1* | 6/2009 | Brede | H04W 88/02 455/456.6 |
| 2009/0149191 | A1* | 6/2009 | Luers | H04W 64/00 455/456.1 |
| 2010/0087205 | A1* | 4/2010 | Kong | H04W 64/00 455/456.1 |
| 2010/0265092 | A1* | 10/2010 | Kim | H04W 64/003 340/8.1 |
| 2013/0059602 | A1* | 3/2013 | Cho | G01S 5/02 455/456.1 |
| 2013/0109413 | A1* | 5/2013 | Das | H04W 64/00 455/456.6 |
| 2013/0122941 | A1* | 5/2013 | Das | H04W 64/00 455/456.5 |
| 2014/0135017 | A1* | 5/2014 | Hirano | H04W 64/003 455/437 |
| 2014/0236476 | A1 | 8/2014 | Khorashadi et al. | |
| 2014/0342756 | A1* | 11/2014 | Houri | H04W 4/025 455/456.2 |
| 2015/0094085 | A1* | 4/2015 | Agrawal | A01K 1/0114 455/456.1 |
| 2015/0334676 | A1* | 11/2015 | Hart | H04W 4/029 455/456.1 |
| 2016/0037300 | A1* | 2/2016 | Vitek | H04W 4/023 455/456.3 |
| 2016/0066154 | A1* | 3/2016 | Shin | H04W 4/80 455/456.1 |
| 2016/0142884 | A1* | 5/2016 | Sears | H04W 4/90 455/404.2 |
| 2016/0277370 | A1* | 9/2016 | Lee | H04W 12/0023 |
| 2016/0349353 | A1* | 12/2016 | Wang | H04W 4/02 |
| 2017/0111763 | A1* | 4/2017 | Morgan | H04B 7/0634 |
| 2017/0111846 | A1* | 4/2017 | Kang | H04W 40/244 |
| 2017/0127236 | A1* | 5/2017 | Suzuki | G01S 5/0242 |
| 2017/0188331 | A1* | 6/2017 | Rao | H04W 4/029 |
| 2017/0272914 | A1* | 9/2017 | Saito | H04W 4/029 |
| 2017/0280281 | A1* | 9/2017 | Pandey | H04B 17/318 |
| 2018/0106618 | A1* | 4/2018 | Cerchio | H04W 4/027 |
| 2018/0288725 | A1* | 10/2018 | Chen | H04W 64/00 |
| 2018/0321356 | A1* | 11/2018 | Kulkarni | G01S 5/14 |

FOREIGN PATENT DOCUMENTS

| | | |
|---|---|---|
| JP | 2016-134696 | 7/2016 |
| WO | 2007/069901 | 6/2007 |
| WO | 2012/160560 | 11/2012 |

OTHER PUBLICATIONS

Patent Abstracts of Japan English Abstract for Japanese Patent Application Publication No. 2011-017684, published Jan. 27, 2011.
Patent Abstracts of Japan English Abstract for Japanese Patent Application Publication No. 2016-134696, published Jul. 25, 2016.
Patent Abstracts of Japan English Abstract for Japanese Patent Application Publication No. 2001-013243, published Jan. 19, 2001.

* cited by examiner

| BEACON ID | INSTALLATION LOCATION | THRESHOLD OF RADIO SIGNAL STRENGTH |
|---|---|---|
| B001 | X1, Y1, Z1 | a1 |
| B002 | X2, Y2, Z2 | a2 |
| B003 | X3, Y3, Z3 | a3 |
| ... | ... | ... |

| DEVICE TYPE | VERSION | RECORDABLE NUMBER | ... |
|---|---|---|---|
| Dev1 | V2 | 100 | ... |
| Dev1 | V1 | 0 | ... |
| Dev2 | V1 | 150 | ... |
| ... | ... | ... | ... |

| NEIGHBORING BEACON ID | OTHER BEACON IDs | | | |
|---|---|---|---|---|
| | PRIORITY_1 | PRIORITY_2 | PRIORITY_3 | ... |
| B001 | B010 | B038 | B024 | ... |
| B002 | B060 | B071 | B023 | ... |
| B003 | B005 | B012 | B089 | ... |
| ... | ... | ... | ... | ... |

FIG.23

| DEVICE ID | BEACON ID |
|---|---|
| D001 | B001, B010, B038, ··· |
| D002 | B009, B110, B111, ··· |
| D003 | B014, B089, B091, ··· |
| ··· | ··· |

| BEACON ID | WRITING NUMBER |
|---|---|
| B001 | 103 |
| B002 | 43 |
| B003 | 6 |
| ··· | ··· |

530

INFORMATION PROCESSING SYSTEM, INFORMATION PROCESSING APPARATUS, AND INFORMATION PROCESSING METHOD

CROSS-REFERENCE TO RELATED APPLICATIONS

This application is based upon and claims the benefit of priority of the prior Japanese Patent Application No. 2016-229209, filed on Nov. 25, 2016, the entire contents of which are incorporated herein by reference.

FIELD

The embodiments discussed herein are related to an information processing system, an information processing apparatus, and an information processing method.

BACKGROUND

In recent years, portable or wearable devices that sense various surrounding situations and generate various sets of sensing information have been known. For instance, an Internet of Things (IoT) device is known to sense radio signals transmitted from beacon transmitters arranged beforehand and to generate sensing information indicating a current location.

In such an IoT device, for instance, after beacon information indicating an installation location and the like is stored beforehand for each of the beacon transmitters, by measuring the current location by using the beacon information and information (a beacon ID, a radio signal strength, and the like) acquired by the sensing, the sensing information is generated.

PATENT DOCUMENTS

[Patent Document 1]
Japanese Laid-open Patent Publication No. 2011-17684
[Patent Document 2]
Japanese Laid-open Patent Publication No. 2016-134696
[Patent Document 3]
Japanese Laid-open Patent Publication No. 2001-13243

SUMMARY

According to one aspect of the embodiments, there is provided an information processing system, including: a device that conducts a predetermined process by sensing a neighboring radio signal state; and an information processing apparatus that is connected to the device, wherein the information processing apparatus includes a first memory, and a first processor coupled to the first memory and the first processor configured to: store multiple sets of neighboring definition information in which a neighboring signal state is defined, in the first memory, specify neighboring definition information depending on a location indicated by location information from among the multiple sets of neighboring definition information based on the location information received from the device, and send the specified neighboring definition information to the device, and wherein the device includes a second memory, and a second processor coupled to the second memory and the second processor configured to: conduct the predetermined process using neighboring information received from the information processing apparatus and generate sensing information indicating a process result acquired by the predetermined process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of beacon information stored in both beacon information storage parts;

FIG. 7 is a diagram illustrating an example of device management information stored in both the beacon information storage parts;

FIG. 8 is a diagram illustrating an example of priority information stored in the priority information storage part;

FIG. 23 is a diagram illustrating an example of device writing information stored in a device writing information storage part according to the fourth embodiment;

FIG. 24 is a diagram illustrating an example of writing number information stored in a writing number information storage part according to the fourth embodiment;

DESCRIPTION OF EMBODIMENTS

In order to store sensing information of multiple beacon transmitters beforehand, many portable or wearable devices have insufficient storage capacity. Therefore, for instance, it may be difficult for such a device to store beacon information of the beacon transmitters widely installed beforehand. Accordingly, in this case, it is difficult to measure the current location of the device over a wide range and with high accuracy.

Preferred embodiments of the present invention will be described with reference to the accompanying drawings.

First Embodiment

Figure 1:
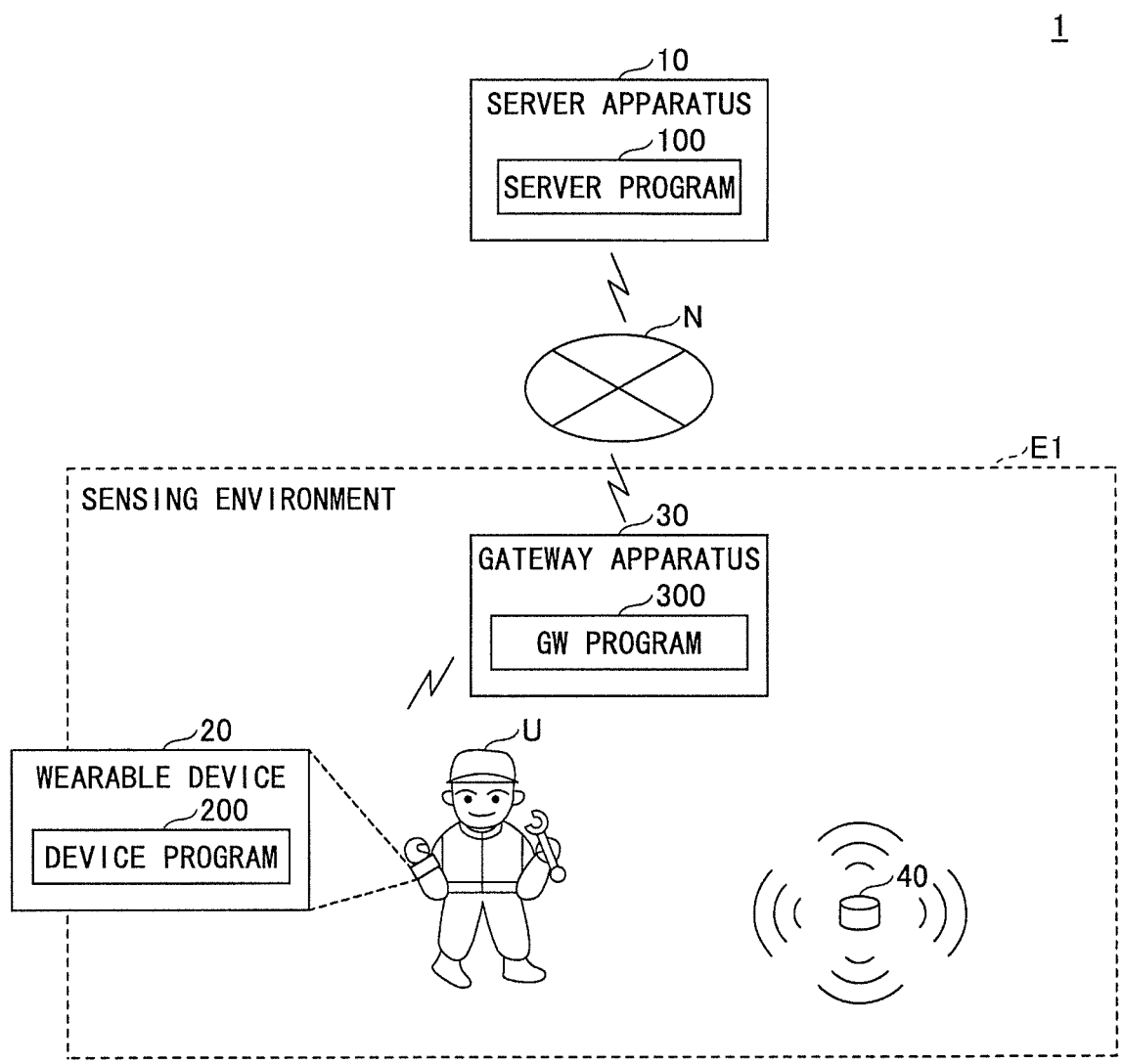
FIG. 1 is a diagram illustrating an example of the entire configuration of a sensing system according to a first embodiment.

First, an entire configuration of a sensing system 1 according to an first embodiment will be described with reference to FIG. 1. FIG. 1 is a diagram illustrating an example of the entire configuration of the sensing system according to the first embodiment.

As illustrated in FIG. 1, the sensing system 1 according to the first embodiment includes a server apparatus 10 and a sensing environment E1. For instance, the server apparatus 10 and the sensing environment E1 are communicably connected via a wide area network N (hereinafter, simply called "network N") such as the Internet or a telephone line network.

The sensing environment E1 corresponds to an environment to generate the sensing information by sensing surrounding situations. The sensing environment E1 includes one or more wearable devices 20, one or more gateway apparatuses 30, and multiple beacon transmitters 40.

In the first embodiment, a case example will be described. In this case, the wearable device 20 senses the radio signals (beacons) transmitted from the beacon transmitters 40, measures a location of the wearable device 20, and generates the location information indicating the location.

The wearable device 20 is regarded as an IoT device or the like wearable on clothes and a body of a user U. A device program 200 is installed into the wearable device 20, and functions as a beacon receiver.

The wearable device 20 generates, by the device program 200, location information by sensing the radio signal transmitted from the beacon transmitter 40 installed in the sensing environment E1, and measuring the location of the wearable device 20. Then, for instance, the wearable device 20 sends the location information generated by using a Bluetooth (registered trademark) Low Energy (BLE) or the like.

Next, the wearable device 20 measures the location of the wearable device 20 by using the beacon information indicating installation locations of surrounding beacon transmitters 40. A beacon ID is regarded as identification information for identifying the beacon transmitter 40. In this case, the beacon information is an example of neighboring definition information.

For instance, the gateway apparatus 30 may be a personal computer (PC), a smart phone, a tablet terminal, a network device, or the like. A GateWay (GW) program 300 is installed into the gateway apparatus 30.

The gateway apparatus 30 sends, by the GW program 300, the location information received from the wearable device 20 to the server apparatus 10. Also, the gateway apparatus 30 dynamically updates, by the GW program 300, the beacon information being stored in the wearable device 20.

For instance, the beacon transmitter 40 is regarded as a device that sends the beacon ID of the beacon transmitter 40 to surroundings by using the BLE or the like. The beacon transmitters 40 are installed at predetermined intervals (every 10 m) in the sensing environment E1.

For instance, the server apparatus 10 may be a personal computer (PC) or the like. The server program 100 is installed into the apparatus 10.

The server apparatus 10 maintains the location information received from the gateway apparatus 30. By the above described operations, for instance, it is possible for the server apparatus 10 to analyze a moving line of the user U (a worker or the like of a factory) in the sensing environment E1 such as a factory.

Figure 2:
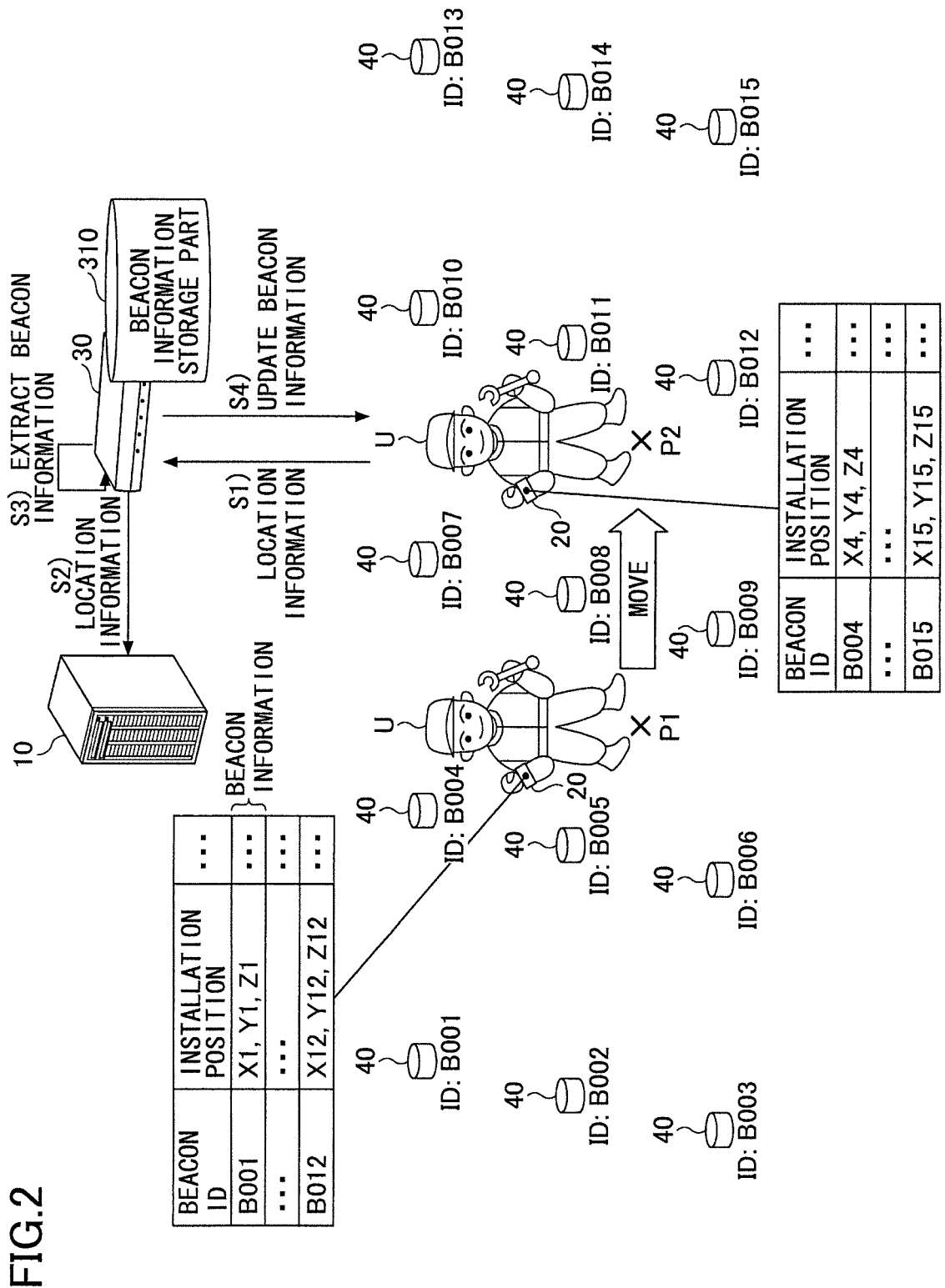
FIG. 2 is a diagram for briefly explaining a process of the sensing system according to the first embodiment.

Next, a process of the sensing system 1 according to the first embodiment will be briefly described with reference to FIG. 2. FIG. 2 is a diagram for briefly explaining the process of the sensing system 1 according to the first embodiment. In an example depicted in FIG. 2, a case example of a movement of the user U will be described. In this case, the user U wearing the wearable device 20 moves from a point P1 to a point P2 in the sensing environment E1.

In the point P1, the wearable device 20 stores the beacon information of the surrounding beacon transmitters 40. That is, in the point P1, it is assumed that the wearable device 20 stores the beacon information of a beacon ID "B001", the beacon information of a beacon ID "B002", . . . , and the beacon information of a beacon ID "B012". And, at this point, the user U moves from the point P1 to the point P2.

In step S1, the wearable device 20 sends, by the device program 200, the location information of the wearable device 20 to the gateway apparatus 30.

In step S2, when receiving the location information from the wearable device 20, the gateway apparatus 30 sends, by the GW program 300, the location information to the server 10. Thus, the location information of the wearable device 20 is stored in the server apparatus 10.

Next, in step S3, the gateway apparatus 30 extracts, by the GW program 300, the beacon information used to measure the location of the wearable device 20 at the point P2 from a beacon information storage part 310.

For instance, the beacon information used to measure the location of the wearable device 20 at the point P2 may be information of the beacon transmitters 40 installed near the point P2. Accordingly, the gateway apparatus 30 may extract the beacon information of the beacon ID "B004", the beacon information of the beacon ID "B005", . . . , and the beacon information of the beacon ID "B015" from multiple sets of the beacon information stored in the beacon information storage part 310.

Next, in step S4, the gateway apparatus 30 updates, by the GW program 300, the beacon information stored in the wearable device 20 by sending the extracted beacon information to the wearable device 20.

Thus, the multiple sets of the beacon information stored in the wearable device 20 are updated by the beacon information of the beacon ID "B004", the beacon information of the beacon ID "B005", . . . , and the beacon information of the beacon ID "B015".

As described above, in the sensing system 1 according to the first embodiment, depending on the location of the wearable device 20, the beacon information stored in the wearable device 20 is dynamically updated. Accordingly, even in a case in which a storage capacity of the wearable device 20 is not sufficient, it is possible for the sensing system 1 according to the first embodiment to store the beacon information used to measure the location in the sensing environment E1 in the wearable device 20. Therefore, in the sensing system 1 according to the first embodiment, it is possible to measure the location of the wearable device 20 with high accuracy, even if the sensing environment E1 is at a wide range.

Figure 3:
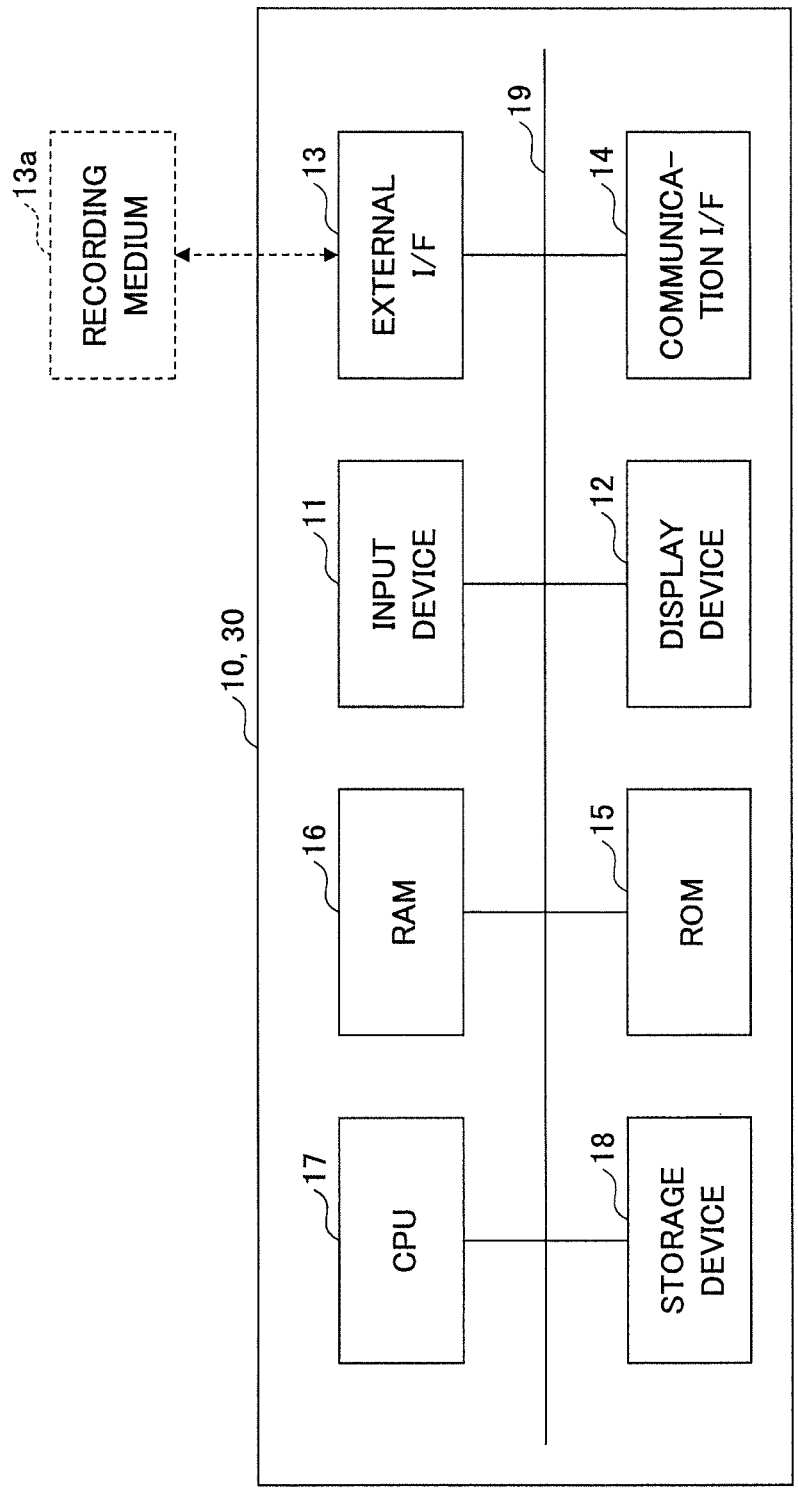
FIG. 3 is a diagram illustrating an example of a hardware configurations of a server apparatus and a gateway apparatus according to the first embodiment.

Next, hardware configurations of the server apparatus 10 and the gateway apparatus 30 according to the first embodiment will be described with reference to FIG. 3. FIG. 3 is a diagram illustrating an example of the hardware configurations of the server apparatus 10 and the gateway apparatus 30 according to the first embodiment. The server apparatus 10 and the gateway apparatus 30 may have the same hardware configuration. Hence, in the following, the hardware configuration of the server apparatus 10 will be mainly described.

As illustrated in FIG. 3, the server apparatus 10 according to the first embodiment includes an input device 11, a display device 12, an external I/F 13, a communication I/F 14, and a Read Only Memory (ROM) 15. Also, the server apparatus 10 according to the first embodiment includes a Random Access Memory (RAM) 16, a Central Processing Unit (CPU) 17, and a storage device 18, which are mutually connected via a bus 19.

For instance, the input device 11 may include various types of buttons, a touch panel, a keyboard, a mouse, or the like. For instance, the display device 12 displays various process results acquired by the server apparatus 10 on a screen. The server apparatus 10 and the gateway apparatus 30 may not include at least either one of the input device 11 and the display device 12.

The external I/F 13 is an interface to an external device. A recording medium 13a or the like corresponds to the external device. The server apparatus 10 reads out from or writes into the recording medium 13a through the external I/F 13. The recording medium 13a may be any type of a recording medium, which is a non-transitory tangible computer-readable medium including a data structure. For instance, a Secure Digital (SD) memory card, a Universal Serial Bus (USB) memory, a Compact Disk (CD), a Digital Versatile Disk (DVD), or the like may correspond to the recording medium 13a.

The communication I/F 14 is an interface for the server apparatus 10 to conduct data communications with another apparatus (which may be the gateway apparatus 30 or the like) through the network N.

The ROM 15 may be a non-volatile semiconductor memory capable of retaining data even after power is off. The RAM 16 is a volatile semiconductor memory temporarily retaining programs and data. For instance, the CPU 17 reads out the program and the data from the storage device 18 or the ROM 15 onto the RAM 16, and is regarded as a processor for executing various processes.

For instance, the storage device 18 may be a Hard Disk Drive (HDD), a Solid State Drive (SSD), or the like, and is a non-volatile memory storing programs and data. For instance, the programs and the data stored in the storage device 18 may include a server program 100 and an Operating System (OS), and various application programs activating on the OS. For instance, the storage device 18 of the gateway apparatus 30 stores the GW program 300 and the like.

Each of the server apparatus 10 and the gateway apparatus 30 according to the first embodiment may include a hardware configuration illustrated in FIG. 3, and realize various processes described later.

Figure 4:
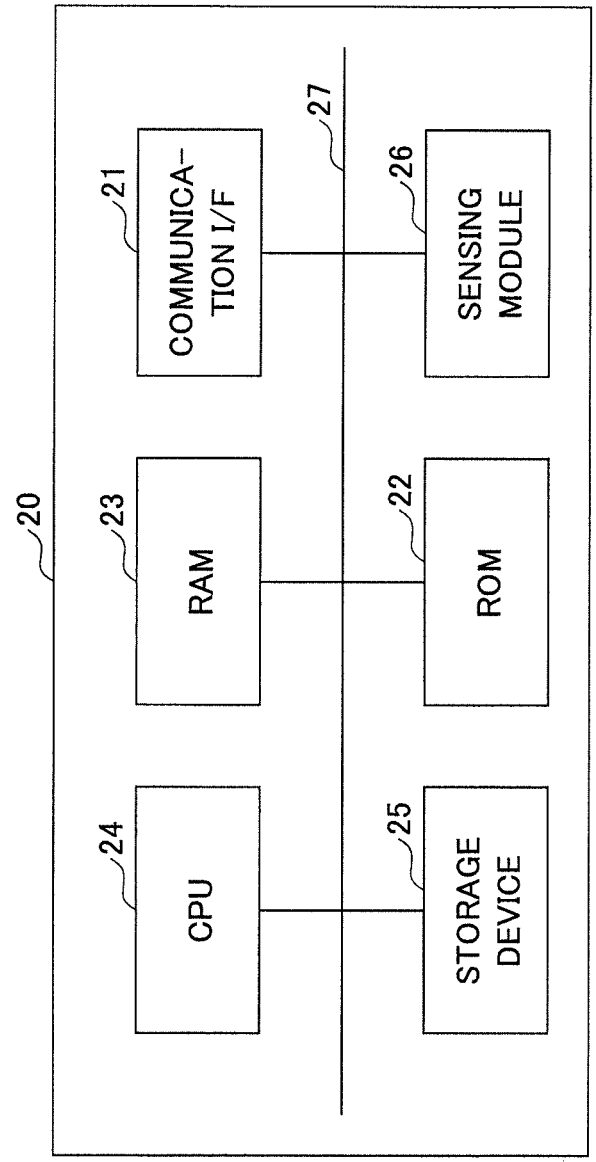
FIG. 4 is a diagram illustrating an example of a hardware configuration of a wearable device according to the first embodiment.

Next, the hardware configuration of the wearable device 20 according to the first embodiment will be described with reference to FIG. 4. FIG. 4 is a diagram illustrating an example of the hardware configuration of the wearable device according to the first embodiment.

As illustrated in FIG. 4, the wearable device 20 according to the first embodiment includes a communication I/F 21, a ROM 22, a RAM 23, a CPU 24, a storage device 25, and a sensing module 26, which are mutually connected via a bus 27.

The communication I/F 21 is an interface for the wearable device 20 to conduct data communication with another apparatus (for instance, the gateway apparatus 30, the beacon transmitter 40, or the like).

The ROM 22 is a non-volatile semiconductor memory capable of retaining data even if power is off. The RAM 23 is a volatile semiconductor memory temporarily retaining programs and data. For instance, the CPU 24 is regarded as a processor which reads out the program and the data from the storage device 25 or the ROM 22 into the RAM 23, and executes various processes.

For instance, the storage device 25 may be a non-volatile memory such as a flash memory or the like, which stores the programs and the data. For instance, the programs and the data stored in the storage device 25 may include the device program 200, an OS, various application programs activating on the OS, and the like.

For instance, the sensing module 26 may be a Bluetooth Low Energy (BLE) module or the like. The sensing module 26 may include an acceleration sensor, a receiver of a Global Positioning System (GPS), a temperature sensor, and the like.

The wearable device 20 according to the first embodiment includes a hardware configuration illustrated in FIG. 4 and realizes various processes described later.

Figure 5:
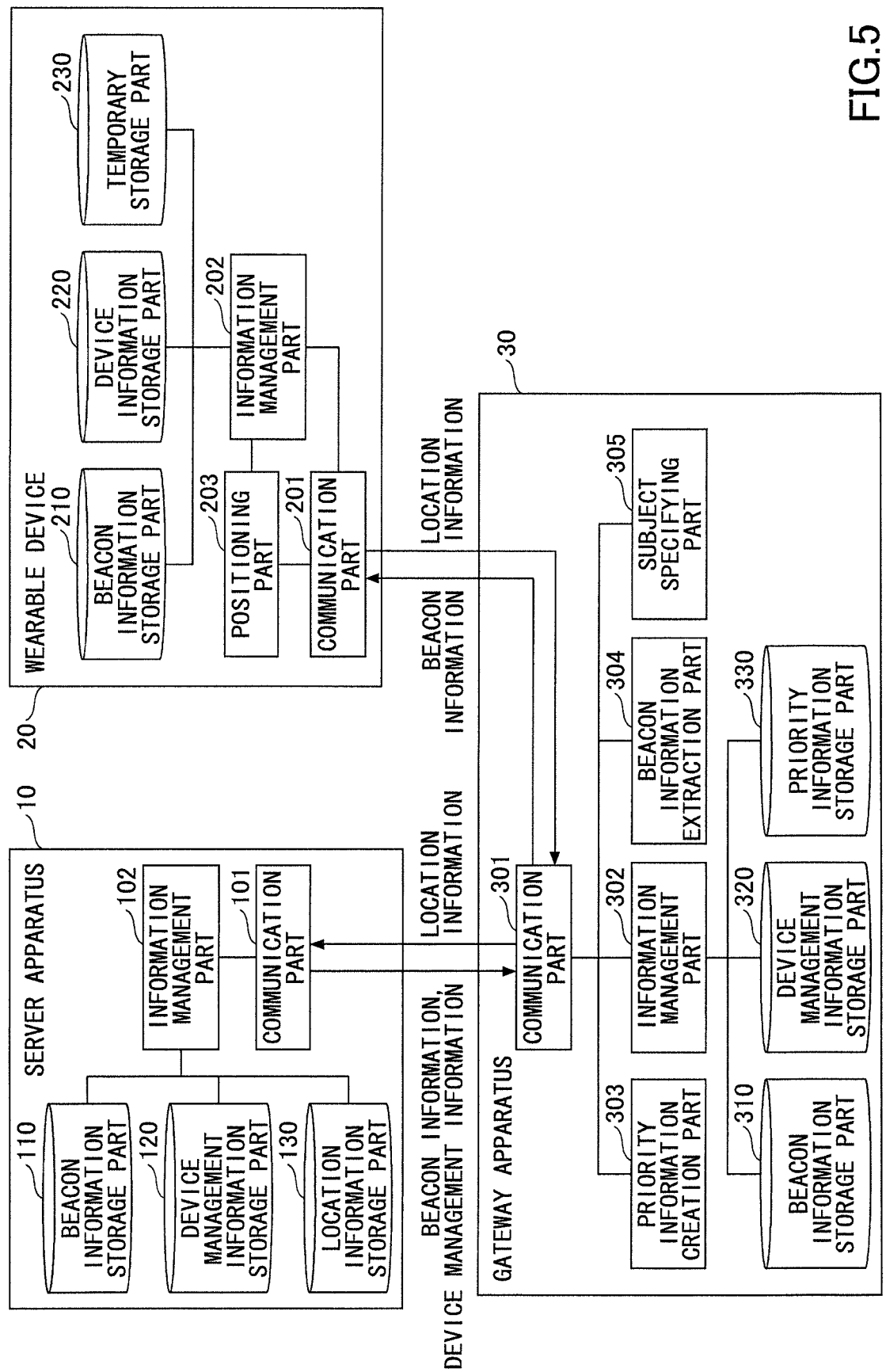
FIG. 5 is a diagram illustrating an example of a functional configuration of the sensing system according to the first embodiment.

Next, a functional configuration of the sensing system 1 according to the first embodiment will be described with reference to FIG. 5. FIG. 5 is a diagram illustrating an example of the functional configuration of the sensing system according to the first embodiment.

As illustrated in FIG. 5, the server apparatus 10 according to the first embodiment includes a communication part 101 and an information management part 102. The communication part 101 and the information management part 102 are realized by respective processes, which the server program 100 installed in the server apparatus 10 causes the CPU 17 to perform.

Also, the server apparatus 10 according to the first embodiment includes a beacon information storage part 110, a device management information storage part 120, and a location information storage part 130. These storage parts 110, 120, and 130 may be realized by using the storage device 18. One or more of the storage parts 110, 120, and 130 may be realized by using a storage device or the like connected to the server apparatus 10 through the network N.

The communication part 101 conducts data communications with the gateway apparatus 30 through the network N. For instance, the communication part 101 sends the beacon information stored in the beacon information storage part 110 and device management information stored in the device management information storage part 120 to the gateway apparatus 30. Also, the communication part 101 receives location information indicating the wearable device 20 from the gateway apparatus 30.

The information management part 102 maintains various sets of information. That is, the information management part 102 maintains the beacon information stored in the beacon information storage part 110, the device management information stored in the device management information storage part 120, and the location information stored in the location information storage part 130. The information management part 102 writes information to these storage parts 110, 120, and 130 (including a storing or saving of information, an updating of information being stored in these storage parts 110, 120, and 130, and the like), and reads out the information stored in these storage parts 110, 120, and 130 (including an acquiring or referring of the information stored in these storage parts 110, 120, and 130, and the like).

The beacon information storage part 110 stores the beacon information. Details of the beacon information stored in the beacon information storage part 110 will be described later.

The device management information storage part 120 stores the device management information. Details of the device management information stored in the device management information storage part 120 will be described later.

The location information storage part 130 stores the location information. The location information indicates a location measured by the wearable device 20. For instance, in the location information storage part 130, the location information may be associated with a device ID for identifying the wearable device 20, date and time when the location is measured, and the like.

As illustrated in FIG. 5, the gateway apparatus 30 according to the first embodiment includes a communication part 301, an information management part 302, a priority information creation part 303, a beacon information extraction part 304, and a subject specifying part 305. These parts 301 through 305 are realized by respective processes, which the GW program 300 installed in the gateway apparatus 30 causes the CPU 17 to perform.

Also, the gateway apparatus 30 according to the first embodiment includes a beacon information storage part 310, a device management information storage part 320, and a priority information storage part 330. These storage parts 310, 320, and 330 may be realized by using the storage device 18. One or more of the storage parts 310, 320, and 330 may be realized by using a storage device or the like connected to the gateway apparatus 30 through the network N.

The communication part 301 conducts data communications with the server apparatus 10 through the network N. Also, the communication part 301 may conduct the data communications with the wearable device 20 by using the BLE or the like. For instance, the communication part 301 sends the beacon information extracted by the subject specifying part 305 among multiple sets of the beacon information stored in the beacon information storage part 310, to the wearable device 20. Alternatively, the communication part 301 may receive the location information indicating the location of the wearable device 20 from the wearable device 20.

The information management part 302 maintains various sets of information. That is, the information management part 302 maintains the beacon information stored in the beacon information storage part 310, the device management information stored in the device management information storage part 320, and priority information stored in the priority information storage part 330. The information management part 302 writes information to these storage parts 310, 320, and 330 (including a storing or saving of information, an updating of information being stored in these storage parts 310, 320, and 330, and the like), and reads out the information stored in these storage parts 310, 320, and 330 (including an acquiring or referring of the information stored in these storage parts 310, 320, and 330, and the like).

The priority information creation part 303 creates the priority information based on the beacon information stored in the beacon information storage part 310. The priority information corresponds to information in which the priority of the beacon information to be extracted from the beacon information storage part 310 is defined for each beacon ID (hereinafter, also called "neighboring beacon ID") of the beacon transmitters 40, which is specified as the one closest to the wearable device 20.

The beacon information extraction part 304 performs an extraction process of the beacon information based on the priority information stored in the priority information storage part 330, the device management information stored in the device management information storage part 320, and the location information received from the wearable device 20. That is, the beacon information extraction part 304 extracts the beacon information used for a positioning from the beacon information storage part 310 depending on the location received from the wearable device 20.

The subject specifying part 305 specifies the beacon information of a writing subject to be written to the wearable device 20 from among one or more sets of the beacon information extracted by the beacon information extraction part 304. That is, the subject specifying part 305 specifies the beacon information, which has not been written to the wearable device 20, among one or more sets of the beacon information extracted by the beacon information extraction part 304, as the writing subject.

Also, the subject specifying part 305 specifies the beacon information of a deleting subject among one or more sets of the beacon information written to the wearable device 20.

The beacon information storage part 310 stores the beacon information. The beacon information storage part 310 stores the same beacon information as that stored in the beacon information storage part 110 of the server apparatus 10.

In the following, the beacon information stored in both the beacon information storage parts 110 and 310 will be described with reference to FIG. 6. FIG. 6 is a diagram illustrating an example of the beacon information stored in both the beacon information storage parts.

As illustrated in FIG. 6, the beacon information stored in both the beacon information storage parts 110 and 310 includes data items of "BEACON ID", "INSTALLATION LOCATION", "THRESHOLD OF RADIO SIGNAL STRENGTH", and the like.

The "BEACON ID" indicates identification information for identifying the beacon transmitter 40. The "INSTALLATION LOCATION" indicates the location where the beacon transmitter 40 is installed, and indicates a latitude, a longitude, and a height, for instance.

The "THRESHOLD OF RADIO SIGNAL STRENGTH" indicates a threshold for positioning the wearable device 20 to determine whether the wearable device 20 is positioned nearby the beacon transmitter 40. The wearable device 20 determines a position as nearby the beacon transmitter 40, upon determining that the radio signal strength of a radio wave received from the beacon transmitter 40 exceeds the threshold.

As described above, in the beacon information stored in both the beacon information storage parts 110 and 310, for each of beacon IDs, the installation location of the beacon transmitter 40 and the threshold of the radio signal strength are associated with the beacon ID.

Referring back to FIG. 5, the device management information storage part 320 stores the device management information. The device management information storage part 320 stores the same device management information as that stored in the device management information storage part 120 of the server 10.

Next, the device management information stored in both the device management information storage parts 120 and 320 will be described with reference to FIG. 7. FIG. 7 is a diagram illustrating an example of the device management information stored in both the device management information storage parts.

As described in FIG. 7, the device management information stored in both the beacon information storage parts includes data items of "DEVICE TYPE", "VERSION", "RECORDABLE NUMBER", and the like.

The data item "DEVICE TYPE" indicates a type of the wearable device 20. For instance, a product name, a product code, or the like of the wearable device 20 is set to the "DEVICE TYPE". The "VERSION" indicates a version of the wearable device 20, a version of firmware implemented in the wearable device 20, or the like.

The "RECORDABLE NUMBER" indicates a number of the sets of the beacon information recordable in the wearable device 20, that is, a number of the sets of the beacon information capable of being stored in a beacon information storage part 210, which will be described later. For instance, the recordable number may be defined beforehand for each of device types and versions.

As described, in both the device management information storage parts 120 and 320, for each of the device types and the versions, the device management information is stored by associating with the number of the sets of the beacon information (recordable number), which the wearable device 20 is able to store.

Referring back to FIG. 5, the priority information storage part 330 stores the priority information created by the priority information creation part 303.

The priority information stored in the priority information storage part 330 will be described with reference to FIG. 8. FIG. 8 is a diagram illustrating an example of the priority information stored in the priority information storage part.

As illustrated in FIG. 8, the priority information stored in the priority information storage part 330 includes data items of "NEIGHBORING BEACON ID", "OTHER BEACON IDs", and the like.

The "NEIGHBORING BEACON ID" indicates the beacon ID included in the beacon information. For other beacon IDs, the beacon IDs other than neighboring beacon IDs are set by associating with respective priorities. The priority is associated in order of proximity to the beacon transmitter 40 of the neighboring beacon ID.

That is, for instance, in a case of the neighboring beacon ID "B001", another beacon transmitter 40 of the beacon ID "B010", which is closest to the installation location of the beacon transmitter 40 of the beacon ID "B001", is associated with "PRIORITY_1". In the same manner, the beacon transmitter 40 of the beacon ID "B038", which is next in closeness to the installation location of the beacon transmitter 40 of the beacon ID "B001", is associated with "PRIORITY_2".

As described above, in the priority information stored in the priority information storage part 330, for each of the beacon IDs, in an order of proximity to the installation location of the beacon transmitter 40 of the beacon ID, other beacon IDs are associated with respective priorities.

Referring to FIG. 5, as illustrated in FIG. 5, the wearable device 20 according to the first embodiment includes a communication part 201, an information management part 202, and a positioning part 203. These parts 201 through 203 are realized by processes, which the device program 200 installed in the wearable device 20 causes the CPU 24 to perform.

Also, the wearable device 20 according to the first embodiment includes the beacon information storage part 210, a device information storage part 220, and a temporary storage part 230. These parts 210, 220, and 230 may be realized by using the storage device 25, for instance.

For instance, the communication part 201 conducts data communication with the gateway apparatus 30 by using the BLE or the like. The communication part 201 may send the location information positioned by the positioning part 203 to the gateway apparatus 30. Also, the communication part 201 may receive the beacon information and the beacon ID (that is, the beacon ID of the beacon information of the writing subject or a deletion subject specified by the subject specifying part 305) from the gateway apparatus 30.

Also, the communication part 201 may receive the radio signal transmitted from the beacon transmitter 40 by using the BLE or the like.

The information management part 202 maintains various sets of information. That is, the information management part 202 maintains the beacon information stored in the beacon information storage part 210, device information stored in the device information storage part 220, and the location information temporarily stored in temporary storage part 230. The information management part 202 writes information to these storage parts 210, 220, and 230 (including a storing or saving of information, an updating of information being stored in these storage parts 210, 220, and 230, and the like), and reads out the information stored in these storage parts 210, 220, and 230 (including an acquiring or referring of the information stored in these storage parts 210, 220, and 230, and the like).

The positioning part 203 acquires the beacon ID from the radio signal received form the communication part 201 (the radio signal transmitted from the beacon transmitter 40) at predetermined intervals (for instance, every 1 second). Next, the positioning part 203 generates the location information by positioning the wearable device 20, based on the acquired beacon ID and the beacon information stored in the beacon information storage part 210. In this case, the positioning part 203 may specify the beacon ID (the neighboring beacon ID) of the radio signal having a greatest radio signal strength, which is acquired among radio signals received by the communication part 201.

Also, the positioning part 203 acquires, by the information management part 202, the location information from the temporary storage part 230 at predetermined intervals (for instance, every 30 seconds). The location information acquired from the temporary storage part 230 is transmitted to the gateway apparatus 30 by the communication part 201.

The beacon information storage part 210 stores the beacon information. The beacon information stored in the beacon information storage part 210 corresponds to the beacon information specified by the subject specifying part 305 among sets of the beacon information stored in the beacon information storage part 310 of the gateway apparatus 30.

The device information storage part 220 stores the device information. The device information may be information indicating the device ID for identifying the wearable device 20, the device information, the version, and the like.

The temporary storage part 230 stores the location information indicating a location positioned by the positioning part 203. The temporary storage part 230 may store the neighboring beacon ID specified by the positioning part 203 by associating with the location information. Also, the temporary storage part 230 may further store the device ID for identifying the wearable device 20 measuring the location, the date and time when the location is measured, and the like in association with the location information.

Figure 9:
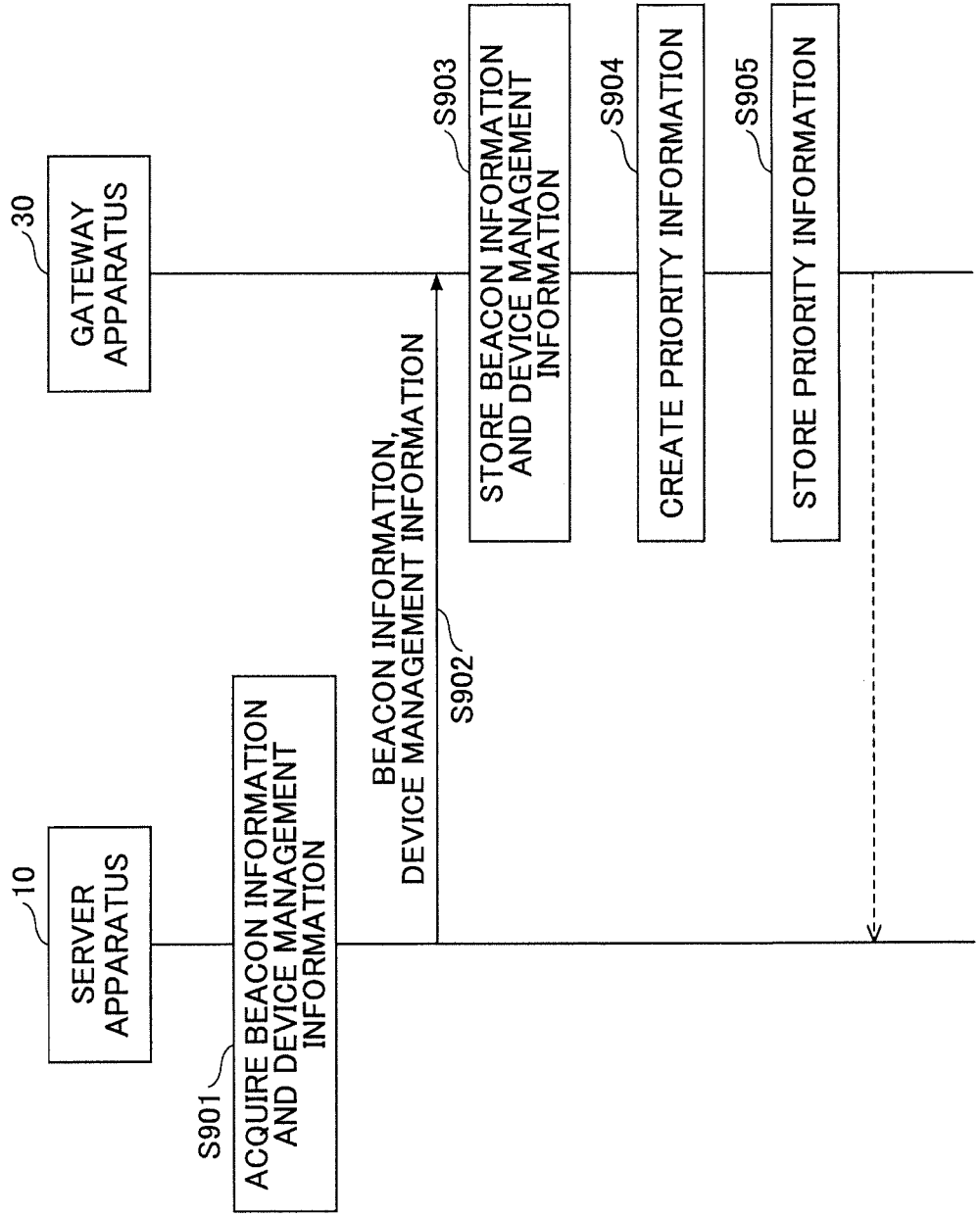
FIG. 9 is a diagram for explaining a sequence example of a storing process for storing the beacon information and the device management information according to the first embodiment.

Next, details of a process of the sensing system 1 according to the first embodiment will be described. First, a process for storing the beacon information and the device management information transmitted from the server apparatus 10 to the gateway apparatus 30 will be described with reference to FIG. 9. FIG. 9 is a diagram for explaining a sequence example of a storing process for storing the beacon information and the device management information according to the first embodiment. For instance, the process depicted in FIG. 9 may conduct an update or the like of at least one of the beacon information stored in the beacon information storage part 310 of the gateway apparatus 30 and the device management information stored in the device management information storage part 320.

First, the information management part 102 of the server apparatus 10 acquires the beacon information stored in the beacon information storage part 110 and the device management information stored in the device management information storage part 120 (step S901).

Next, the communication part 101 of the server apparatus 10 sends the acquired beacon information and device management information to the gateway apparatus 30 (step S902).

The information management part 302 of the gateway apparatus 30 stores the beacon information and the device management information received by the communication part 301 in the beacon information storage part 310 and the device management information storage part 320 respectively (step S903). Thus, the beacon information stored in the beacon information storage part 110 of the server apparatus 10 is stored in the beacon information storage part 310 of the gateway apparatus 30. In the same manner, the device management information stored in the device management information storage part 120 of the server apparatus 10 is stored in the device management information storage part 320 of the gateway apparatus 30.

Next, the priority information creation part 303 of the gateway apparatus 30 creates the priority information based on the beacon information stored in the beacon information storage part 110 (step S904).

Figure 10:
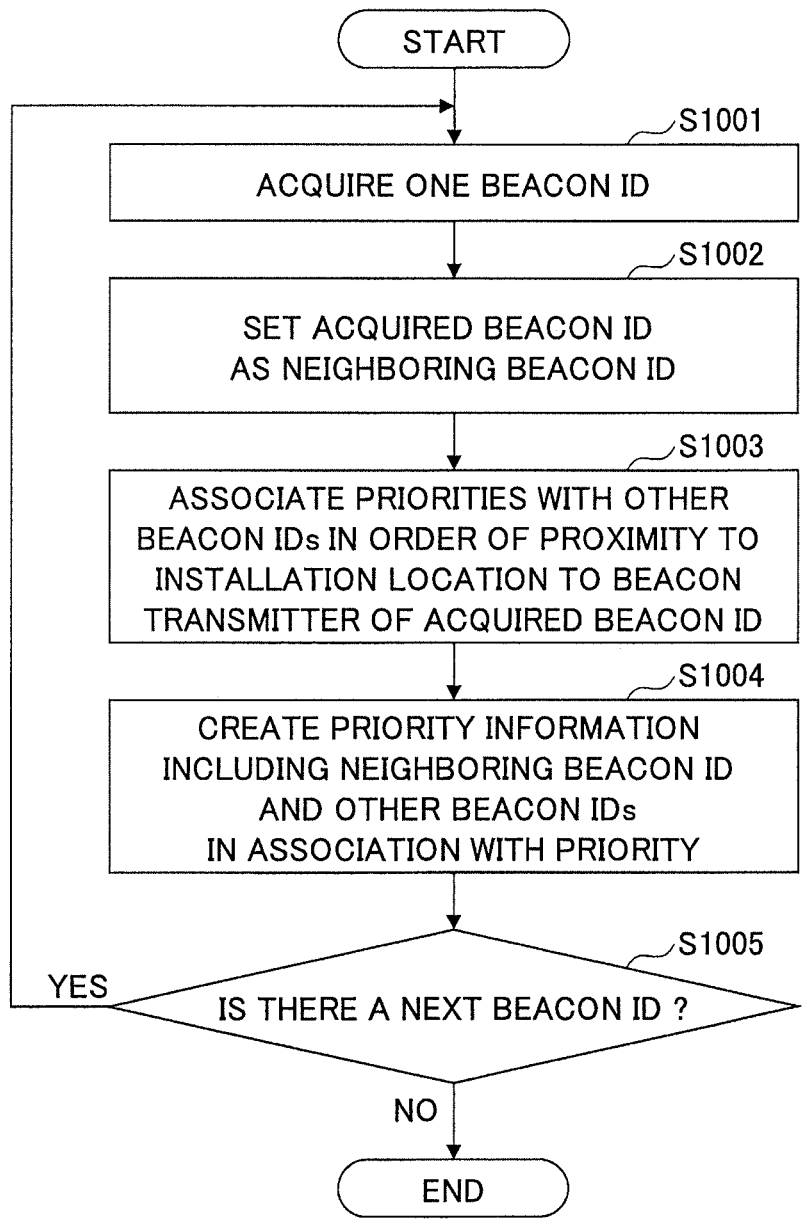
FIG. 10 is a flowchart for explaining an example of a creation process of the priority information according to the first embodiment.

Next, a creation process of the priority information in step S904 above will be described with reference to FIG. 10. FIG. 10 is a flowchart for explaining an example of the creation process of the priority information according to the first embodiment.

Fist, the priority information creation part 303 acquires one beacon ID from the beacon information stored in the beacon information storage part 310 of the information management part 302 (step S1001). That is, the priority information creation part 303 may acquire the beacon ID "B001".

Next, the priority information creation part 303 determines the beacon ID acquired in step S1001 as the neighboring beacon ID (step S1002). That is, the priority information creation part 303 defines the beacon ID "B001" as the neighboring beacon ID.

Next, the priority information creation part 303 acquires, by the information management part 302, the beacon ID (another beacon ID) of another beacon transmitter 40 different from the beacon transmitter 40 of the neighboring beacon ID from the beacon information storage part 310 in an order of proximity to the installation location of the beacon transmitter 40. Then, the priority information creation part 303 associates the beacon ID with the priority in an order in which the beacon ID is acquired from the information management part 302 (step S1003).

That is, for instance, the priority information creation part 303 acquires the beacon IDs "B010", "B038", "B024", and the like of other beacon transmitters 40. Then, the priority information creation part 303 associates the beacon ID "B010" with the "PRIORITY_1". In the same manner, the priority information creation part 303 associates the beacon ID "B038" with the "PRIORITY_2". Also, in the same manner, the priority information creation part 303 associates the beacon ID "B024" with the "PRIORITY_3".

Next, the priority information creation part 303 creates priority information indicating the neighboring beacon ID, and another beacon ID with which the priority is associated (step S1004). Hence, in the order of proximity to the installation location of the beacon transmitter 40 of the neighboring beacon ID, the priority information is created in which the beacon ID (another beacon ID) of another beacon transmitter 40 and the priority is associated with each other.

Next, the priority information creation part 303 determines, by the information management part 302, whether there is a next beacon ID (step S1005). That is, the priority information creation part 303 may determine whether beacon information of a next beacon ID "B002" is stored in the beacon information storage part 310.

In step S1005, when it is determined that there is no next beacon ID, the priority information creation part 303 terminates this creation process.

On the other hand, in step S1005, when it is determined that there is a next beacon ID, the priority information creation part 303 returns to a process of step S1001. That is, the priority information creation part 303 conducts processes of step S1001 through step S1005 for each of beacon IDs of sets of the beacon information stored in the beacon information storage part 310.

As described above, the priority information creation part 303 creates the priority information in which another beacon ID and the priority are associated to each other, in the order of proximity to the installation location of the beacon transmitter 40 of the beacon ID for each of the beacon IDs respective to the sets of the beacon information stored in the beacon information storage part 310.

Referring back to FIG. 9, the information management part 302 of the gateway apparatus 30 stores the priority information created in step S904 in the priority information storage part 330 (step S905). Hence, the priority information storage part 330 stores the priority information created by the priority information creation part 303.

As described above, in the sensing system 1 according to the first embodiment, the beacon information and the device management information being stored in the server apparatus 10 are stored in the gateway apparatus 30. Also, in the sensing system 1 according to the first embodiment, the gateway apparatus 30 creates the beacon information and the priority information.

Hence, in the sensing system 1 according to first embodiment, upon creating and updating the beacon information and the device management information being stored in the server apparatus 10, it is possible to similarly reflect the beacon information and the device management information retained in the gateway apparatus 30 installed in the sensing environment E1.

Figure 11:
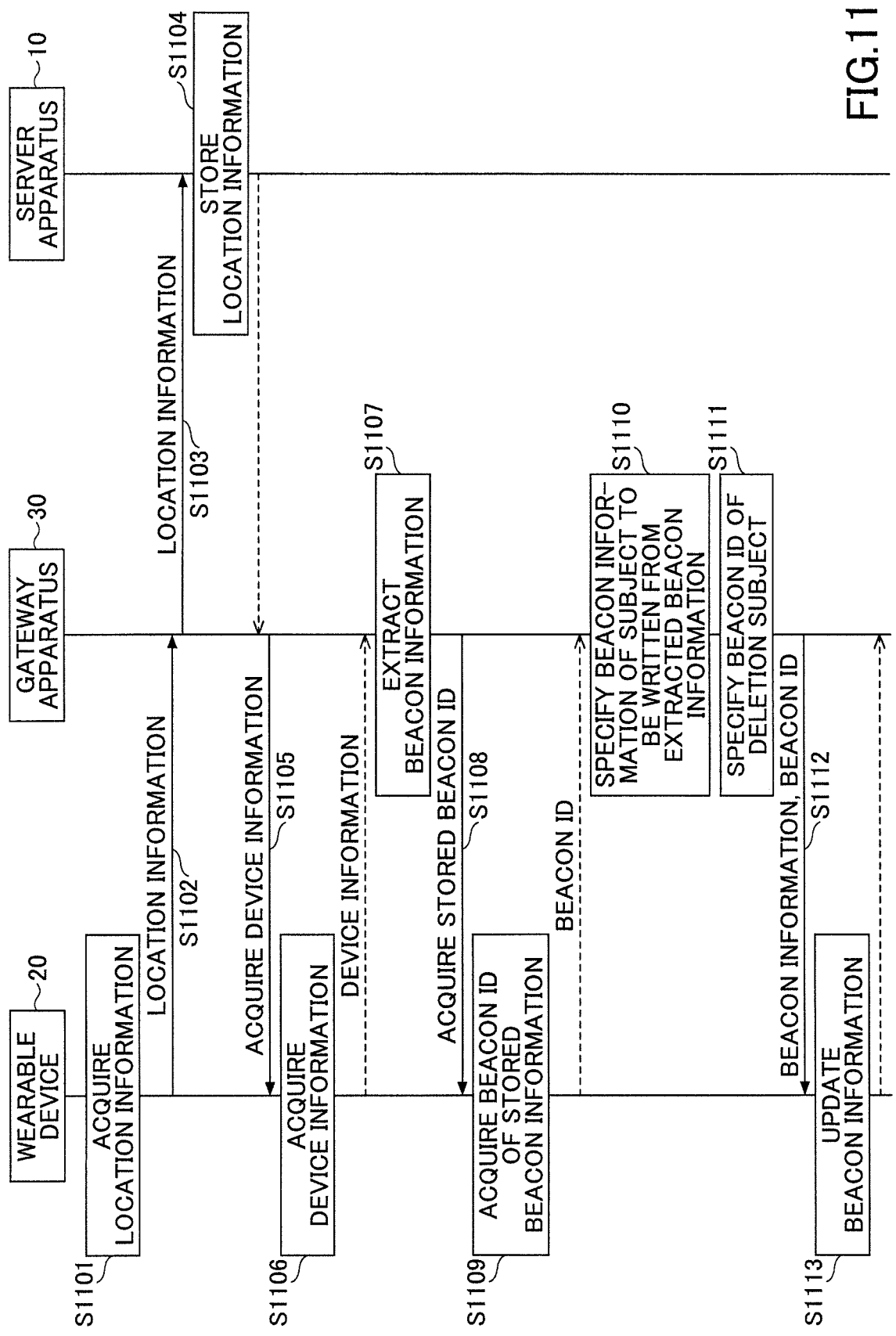
FIG. 11 is a diagram for explaining a sequence example of an update process of the beacon information according to the first embodiment.

Next, an update process for the wearable device 20 to update the beacon information stored therein in response to the location of the wearable device 20 will be described with reference to FIG. 11. FIG. 11 is a diagram for explaining a sequence example of the update process of the beacon information according to the first embodiment.

First, the positioning part 203 of the wearable device 20 acquires, by the information management part 202, the location information from the temporary storage part 230 (step S1101). Thus, the positioning part 203 acquires, by the information management part 202, the location information from the temporary storage part 230 at the predetermined intervals (for instance, every 30 seconds).

In a case of storing multiple sets of the location information in the temporary storage part 230, the information management part 202 may acquire these multiple sets of the location information from the temporary storage part 230. Also, the information management part 202 may acquire the location information, and the neighboring beacon ID associated with the location information from the temporary storage part 230.

The positioning part 203 of the wearable device 20 sends the location information through the communication part 201 to the gateway apparatus 30 when the information management part 202 acquires the location information (step S1102). In this case, when the neighboring beacon ID is acquired in step S1101, the communication part 201 sends the location information and the neighboring beacon ID to the gateway apparatus 30.

Then, the information management part 202 deletes the location information and information associated with the location information from the temporary storage part 230, after sending the location information to the gateway apparatus 30 through the communication part 201.

The communication part 301 of the gateway apparatus 30 sends the location information to the server apparatus 10, when receiving the location information from the wearable device 20 (step S1103).

The information management part 102 of the server apparatus 10 stores the location information to the location information storage part 130, when the communication part 101 receives the location information (step S1104). Hence, the location information indicating the location of the wearable device 20 is stored in the location information storage part 130. In this case, the information management part 102 may store the location information received by the communication part 101 to the location information storage part 130 by associating with the device ID of the wearable device 20, the date and time when the location was measured, and the like.

Next, the beacon information extraction part 304 of the gateway apparatus 30 sends an acquisition request of the device information by the communication part 301 to the wearable device 20 (step S1105).

The information management part 202 of the wearable device 20 acquires the device information from the device information storage part 220, when the communication part 201 receives the acquisition request of the device information (step S1106). Subsequently, the information management part 202 sends back the device information by the communication part 201 to the gateway apparatus 30.

For instance, the wearable device 20 may send the device information with the location information to the gateway apparatus 30 in step S1102. In this case, the gateway apparatus 30 does not need to perform a process of the step S1105.

The beacon information extraction part 304 of the gateway apparatus 30 conducts a beacon extraction process (step S1107). That is, the beacon information extraction part 304 extracts the beacon information used for the positioning from the beacon information storage part 310 depending on the location (of the wearable device 20) indicating the location information received in step S1102.

Figure 12:
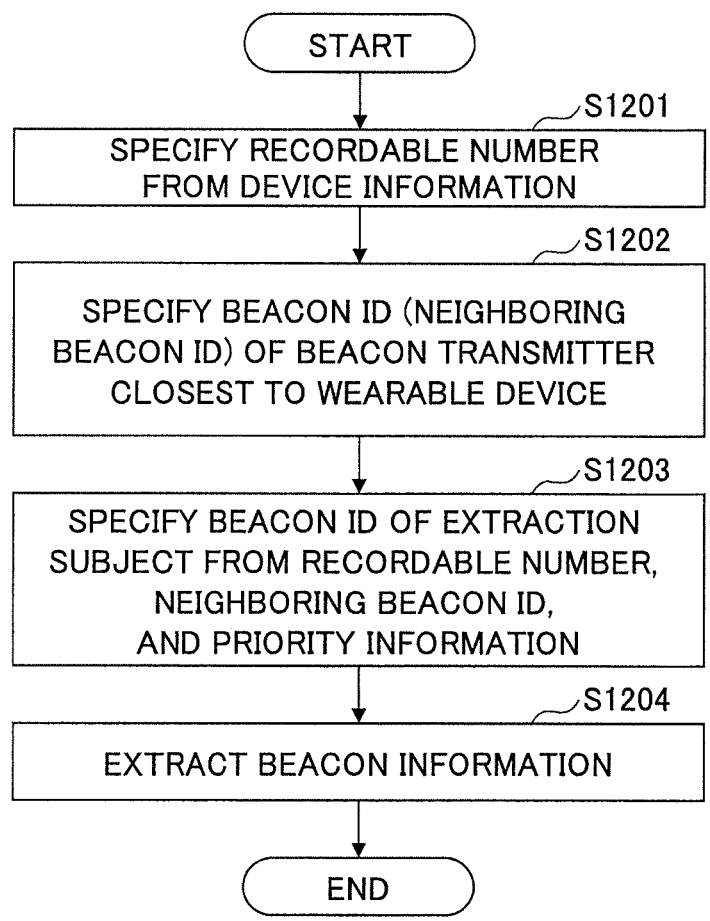
FIG. 12 is a flowchart for explaining an example of an extraction process of the beacon information according to the first embodiment.

Next, the extraction process of the beacon information in step S1107 will be described with reference to FIG. 12. FIG. 12 is a flowchart for explaining an example of the extraction process of the beacon information according to the first embodiment.

First, the beacon information extraction part 304 specifies the recordable number from the device information received in step S1106 by referring to the device management information stored in the device management information storage part 320 by the information management part 302 (step S1201).

For instance, in a case in which the device type indicated in the device information received in step S1106 is "Dev1" and the version is "V2", the beacon information extraction part 304 determines the recordable number to be "100". In the same manner, for instance, in a case in which the device type indicated in the device information received in step S1106 is "Dev1" and the version is "V1", the beacon information extraction part 304 determines the recordable number to be "0".

Next, the beacon information extraction part 304 specifies the beacon ID (the neighboring beacon ID) of the beacon transmitter 40, which is the closest to the wearable device 20, by referring to the beacon information stored in the beacon information storage part 310 by the information management part 302 (step S1202).

That is, the beacon information extraction part 304 specifies the beacon ID of the beacon information indicating the installation location, which is the closest to the location indicated by the location information received in step S1102.

In a case in which the neighboring beacon ID is also transmitted from the wearable device 20 in step S1102, the beacon information extraction part 304 does not need to perform a process of the step S1202. In this case, the beacon information extraction part 304 may conduct a process of step S1203, which will be described later, by using the neighboring beacon ID sent from the wearable device 20.

The beacon information extraction part 304 specifies the recordable number specified in step S1201, the neighboring beacon ID specified in step S1202, and the priority information stored in the priority information storage part 330 (step S1203).

For instance, assume a recordable number of "N" and a neighboring beacon ID of "B001". In this case, the beacon information extraction part 304 specifies the beacon ID "B001" and other beacon IDs associated with the "PRIORITY_1" through "PRIORITY_N−1" in the priority information of the neighboring beacon ID "B001".

Similarly, for example, assume a recordable number of "M" and a neighboring beacon ID of "B002". In this case, the beacon information extraction part 304 specifies the beacon ID "B002" and other beacon IDs associated with the "PRIORITY_1" through "PRIORITY_M−1" in the priority information of the neighboring beacon ID "B002".

Next, the beacon information extraction part 304 extracts, by the information management part 302, the beacon information of the beacon ID of an extraction subject from the beacon information storage part 310 (step S1204).

Accordingly, it is possible for the beacon information extraction part 304 to extract the beacon information for a predetermined number (the recordable number) in the order of the installation location closer to the location, depending on the location of the wearable device 20.

Referring back to FIG. 11, the subject specifying part 305 of the gateway apparatus 30 sends the acquisition request of a stored beacon ID by the communication part 301 to the wearable device 20 (step S1108).

The information management part 202 of the wearable device 20 acquires the beacon ID (that is, the stored beacon ID) from the beacon information stored in the beacon information storage part 210, when the communication part 201 receives the acquisition request of the stored beacon ID (step S1109). Then, the information management part 202 sends back the stored beacon ID by the communication part 201 to the gateway apparatus 30.

The subject specifying part 305 of the gateway apparatus 30 specifies the beacon information of the writing subject from among the sets of the beacon information extracted by the beacon information extraction part 304 (step S1110).

The subject specifying part 305 specifies the beacon information other than the stored beacon information of the beacon ID among the sets of the beacon information extracted by the beacon information extraction part 304. That is, the subject specifying part 305 specifies the beacon information not being stored in the beacon information storage part 210 of the wearable device 20 among the sets of the beacon information extracted by the beacon information extraction part 304.

Next, the subject specifying part 305 of the gateway apparatus 30 specifies beacon IDs of the beacon information of the deletion subject (step S1111). That is, the subject specifying part 305 specifies the beacon IDs, other than the beacon ID of the beacon information extracted by the beacon information extraction part 304, among the stored beacon IDs.

Next, the subject specifying part 305 of the gateway apparatus 30 sends the beacon information (which may be the beacon information of the writing subject) and beacon IDs (which may be the beacon IDs of the beacon information of the deletion subject) by the communication part 301 to the wearable device 20 (step S1112).

The information management part 202 of the wearable device 20 updates the beacon information storage part 210, when the communication part 301 receives the beacon information and the beacon ID (step S1113). That is, the information management part 202 writes the beacon information received by the communication part 301 to the beacon information storage part 210, and deletes the beacon information of the beacon ID received by the communication part 301 from the beacon information storage part 210. By these operations, the beacon information storage part 210 is updated.

As described above, in the sensing system 1 according to the first embodiment, the beacon information storage part 210 of the wearable device 20 is dynamically updated depending on the location of the wearable device 20. By this configuration, in the sensing system 1 according to the first embodiment, even in a case in which a storage capacity of the wearable device 20 is not sufficient, it is possible for the wearable device 20 to store the beacon information used to position the location in the sensing environment E1. Hence, in the sensing system 1 according to the first embodiment, even in a case in which the sensing environment E1 has a wide area, it is possible to position the location of the wearable device 20 with high accuracy.

Figure 13:
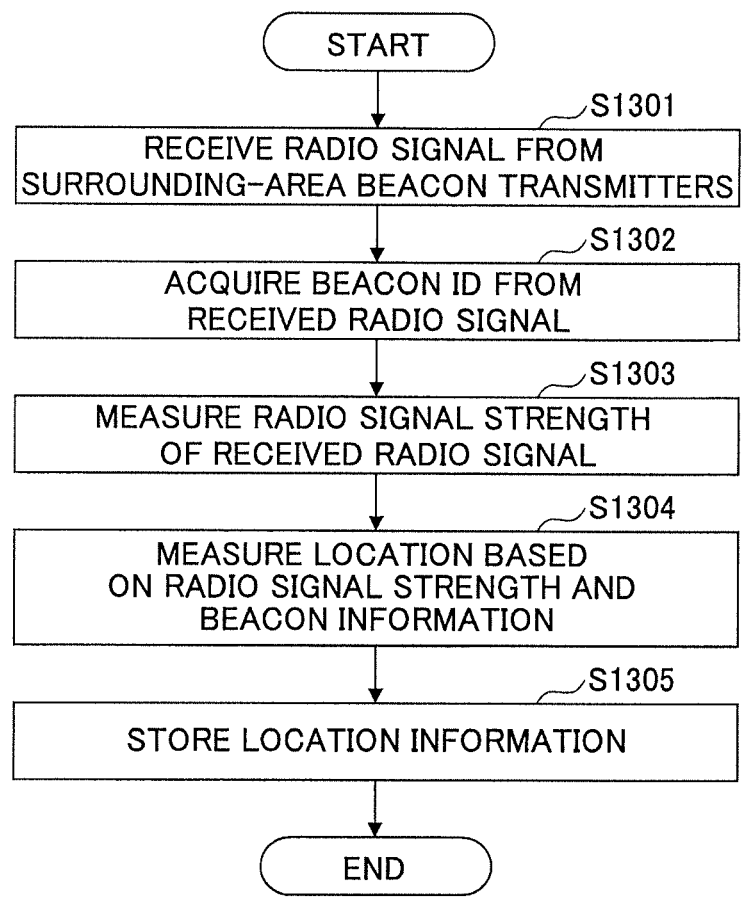
FIG. 13 is a flowchart for explaining an example of a positioning process of the wearable device according to the first embodiment.

Next, a positioning process conducted by the wearable device 20 will be described with reference to FIG. 13. In the positioning process, the wearable device 20 measures the radio signals transmitted from surrounding-area beacon transmitters 40, and generates and stores the location information indicating the location of the wearable device 20. FIG. 13 is a flowchart for explaining an example of the positioning process of the wearable device according to the first embodiment.

First, the positioning part 203 receives the radio signals transmitted from the surrounding-area beacon transmitters 40 by the communication part 201 (step S1301). In step S1301, the positioning part 203 may receive the radio signals transmitted from the surrounding-area beacon transmitters 40 by the communication part 201 at predetermined intervals (for instance, every 1 second).

Next, the positioning part 203 acquires the beacon IDs from the radio signals received by the communication part 201 (step S1302).

Then, the positioning part 203 measures the radio signal strength of the radio signal received by the communication part 201 (step S1303).

Next, the positioning part 203 refers to the beacon information stored in the beacon information storage part 210 by the information management part 202, measures the location of the wearable device 20 based on the beacon ID and the radio signal strength, and generates the location information indicating the location (step S1304).

In step S1304, for instance, in a case in which the radio signal strength measured in step S1303 exceeds the threshold of the radio signal strength for the beacon information as stored in the beacon information storage part 210, the positioning part 203 determines the installation location of the beacon information as the location of the wearable device 20.

For instance, in a case in which the radio signal strength of the radio signal transmitted from the beacon transmitter

40 of the beacon ID "B001" exceeds a strength "a1", the positioning part 203 determines the location of the wearable device 20 to be (X1, Y1, Z1). In the same manner, for instance, in a case in which the radio signal strength of the radio signal transmitted from the beacon transmitter 40 of the beacon ID "B002" exceeds a strength "a2", the positioning part 203 determines the location of the wearable device 20 to be (X2, Y2, Z2).

Also, in a case in which there is no radio signal exceeding the threshold of the radio signal strength for the beacon information as stored in the beacon information storage part 210 among the radio signal strengths measured in step S1303, the positioning part 203 measures the location of the wearable device 20 by using a known positioning method. For instance, the positioning part 203 calculates a weighted mean or the like by using four radio signal strengths indicating greater values among the radio signal strengths measured in step S1304, and beacon IDs respective to the four radio signal strengths, and measures the location of the wearable device 20.

Next, the positioning part 203 stores the location information generated in step S1304 in the temporary storage part 230 by the information management part 202 (step S1305). In step S1305, the information management part 202 may store the beacon ID (that is, the neighboring beacon ID) indicating the greatest radio signal strength, which is acquired from among the radio signal strengths measured in step S1303, in the temporary storage part 230 by associating with the location information. Moreover, for instance, the information management part 202 may store the device ID, the date and time when the location was measured, and the like in association with the location information, in the temporary storage part 230.

As described above, in the sensing system 1 according to the first embodiment, it is possible for the wearable device 20 to conduct the positioning of the radio signals transmitted from the neighboring beacon transmitters 40, and measure the location of the wearable device 20.

Figure 14:
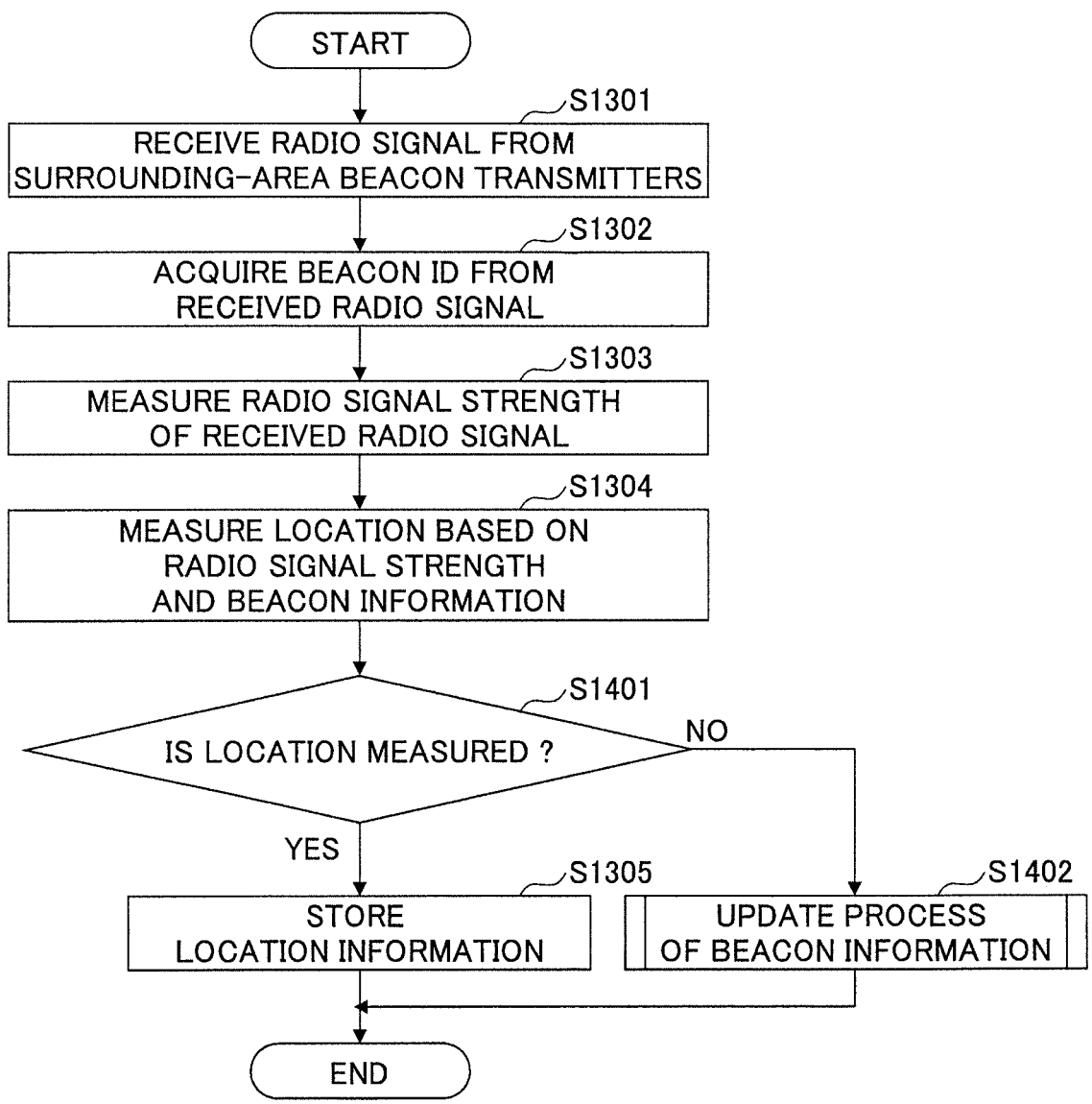
FIG. 14 is a flowchart for explaining an example of another positioning process of the wearable device according to the first embodiment.

Next, another positioning process conducted by the wearable device 20 will be described with reference to FIG. 14. In another positioning process, the wearable device 20 conducts the positioning of the radio signals received from the surrounding-area beacon transmitters 40, and generates and stores the location information indicating the location of the wearable device 20. FIG. 14 is a flowchart for explaining an example of another positioning process of the wearable device according to the first embodiment. Processes in step S1301 through step S1305 are the same as those in FIG. 13, and explanations thereof will be omitted.

Following step S1304, the positioning part 203 determines whether the location of the wearable device 20 is measured (step S1401).

For instance, in a case in which any of the radio signal strengths of the radio signals received from the communication part 201 are weak, a case in which the radio signals are received by the communication part 201 are from fewer than four beacon transmitters 40, or the like may correspond to a case in which the location of the wearable device 20 is not measured. Also, for instance, a case in which the location of the wearable device 20 is not measured may include a case in which the radio signal is temporarily not received due to a radio interference or the like.

In step S1401, when the location of the wearable device 20 is measured, the positioning part 203 conducts a process in step S1305.

However, in the step S1401, when the location of the wearable device 20 is not measured, the positioning part 203 conducts the update process of the beacon information described with reference to FIG. 11 (step S1402). That is, the positioning part 203 acquires location information from the temporary storage part 230, and sends the acquired location information to the gateway apparatus 30.

Accordingly, it is possible for the wearable device 20 to update the beacon information storage part 210 even in a case in which the location is not measured.

As described above, in the sensing system according to the first embodiment, even in a case in which the location of the wearable device 20 is not measured, it is possible to update the beacon information storage part 210 of the wearable device 20. Hence, for instance, even for such a case in which a user U wearing the wearable device 20 moves at high speed and thus the beacon information of the surrounding-area beacon transmitters 40 is not stored, it is possible to update the beacon information storage part 210.

Second Embodiment

Next, a second embodiment will be described. In the second embodiment, the location is predicted based on movement histories (histories of the location information) of the wearable device 20, and the beacon information of the beacon transmitters 40 near the predicted location is also extracted from the beacon information storage part 310.

Figure 15:
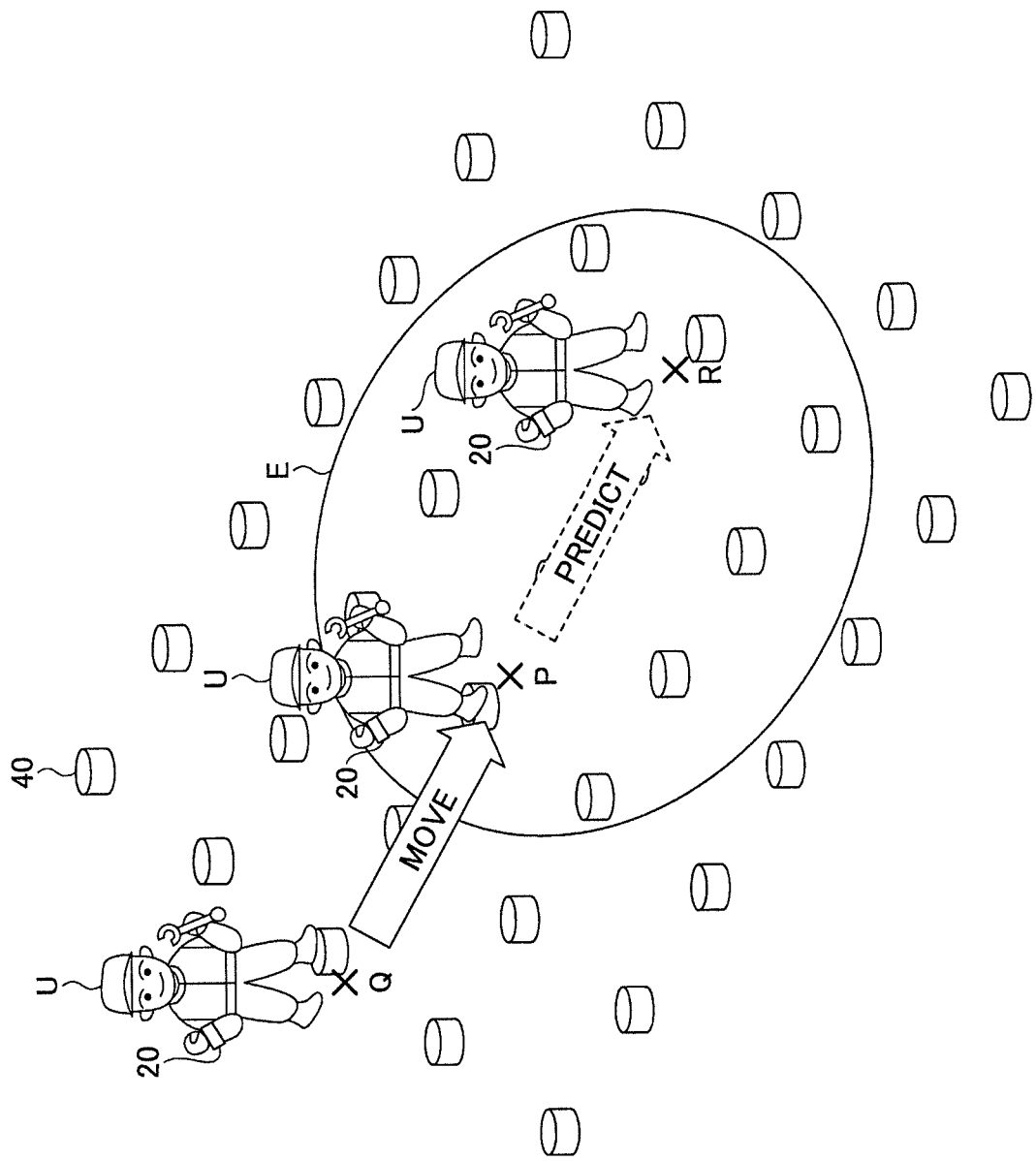
FIG. 15 is a diagram for explaining an example of an extraction of beacon information according to a second embodiment.

For instance, as illustrated in FIG. 15, a "location P" indicates a current location of the user U wearing the wearable device 20 or the like, and a "location Q" indicates a location before a predetermined time (for instance, 30 seconds). That is, FIG. 15 depicts that the user U moved from the location Q to the location P. In this case, in the first embodiment, based on the location Q and the location P, a location R after the predetermined time is predicted. Hence, in the first embodiment, multiple sets of the beacon information of the beacon transmitters 40, which are located within an elliptical area E as the location P and the location R are regarded as focal points, are extracted.

In the sensing system 1 according to the first embodiment, it is possible to extract the beacon information of the surrounding-area beacon transmitters 40 around a location, which is predicted to be a moving destination of the user U wearing the wearable device 20.

In the second embodiment, differences from the first embodiment will be mainly described. Parts that have substantially the same functions and are substantially the same processes as those described in the first embodiment are given by the same reference numbers, and explanations thereof will be omitted.

Figure 16:
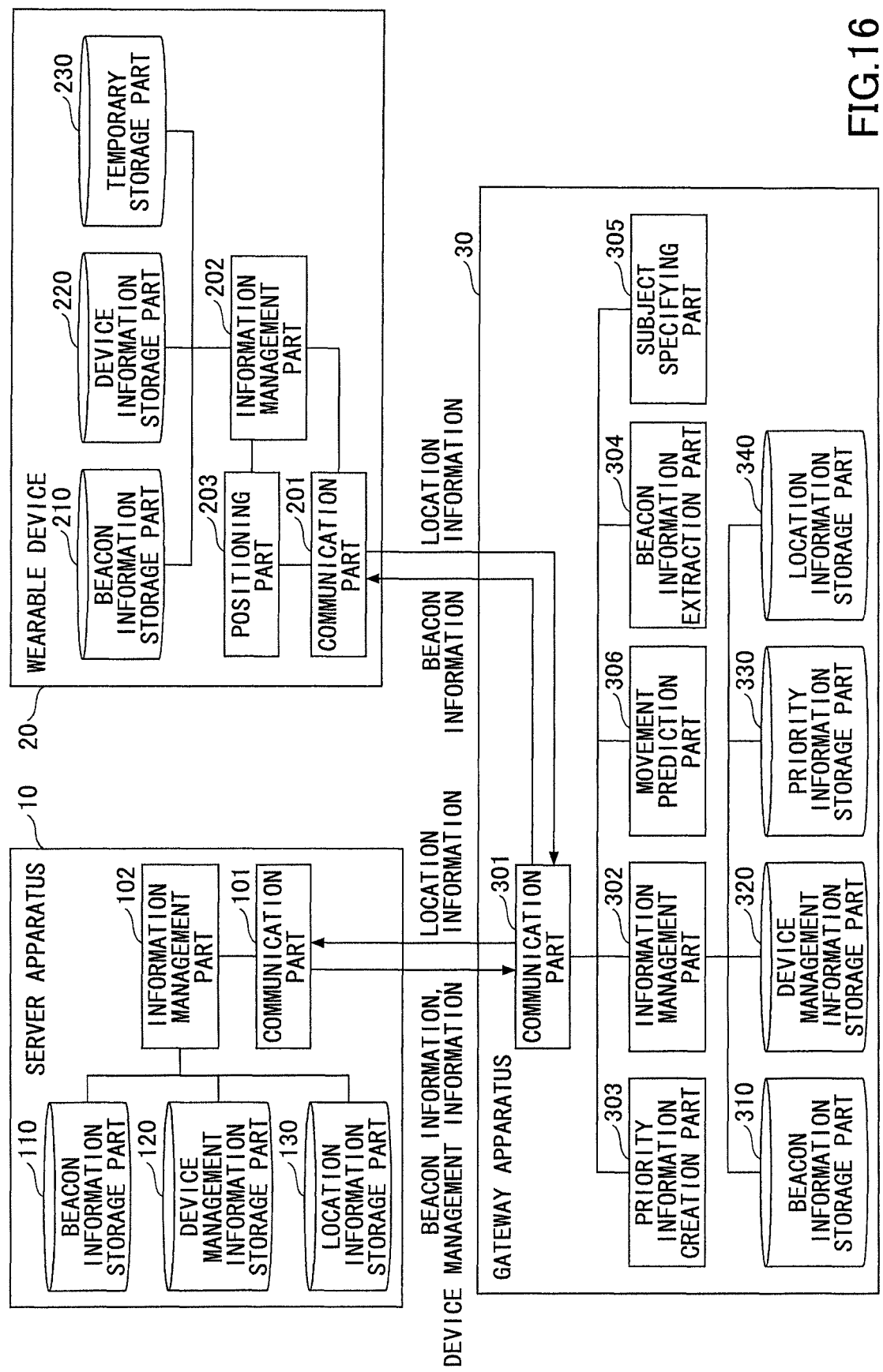
FIG. 16 is a diagram illustrating an example of a functional configuration of a sensing system according to the second embodiment.

First, a functional configuration of the sensing system 1 according to the second embodiment will be described with reference to FIG. 16. FIG. 16 is a diagram illustrating an example of the functional configuration of the sensing system according to the second embodiment.

As illustrated in FIG. 16, the gateway apparatus 30 according to the second embodiment includes a movement prediction part 306. The movement prediction part 306 is realized by processes, which the GW program 300 installed to the gateway apparatus 30 causes the CPU 17 to perform.

Also, the gateway apparatus 30 according to the second embodiment includes a location information storage part 340. The location information storage part 340 may be realized by using the storage device 18. Alternatively, the storage device 18 may be realized by using another storage device or the like connected to the gateway apparatus 30 through the network N.

The movement prediction part 306 predicts a location of the wearable device 20 after the predetermined time (for instance, 30 seconds) based on the histories of the location information stored in the location information storage part 340.

The location information storage part 340 stores the location information. The location information indicates the location measured by the wearable device 20. For instance, the location information storage part 340 may store the device ID of the wearable device 20, the date and time when the location is measured, and the like in association with the location information. That is, the location information storage part 340 stores the histories of the location information for each of wearable devices 20.

For instance, the location information storage part 340 may store a moving velocity (or a moving acceleration) of the user U and the like, which is measured by the wearable device 20, by associating with the location information.

Figure 17:
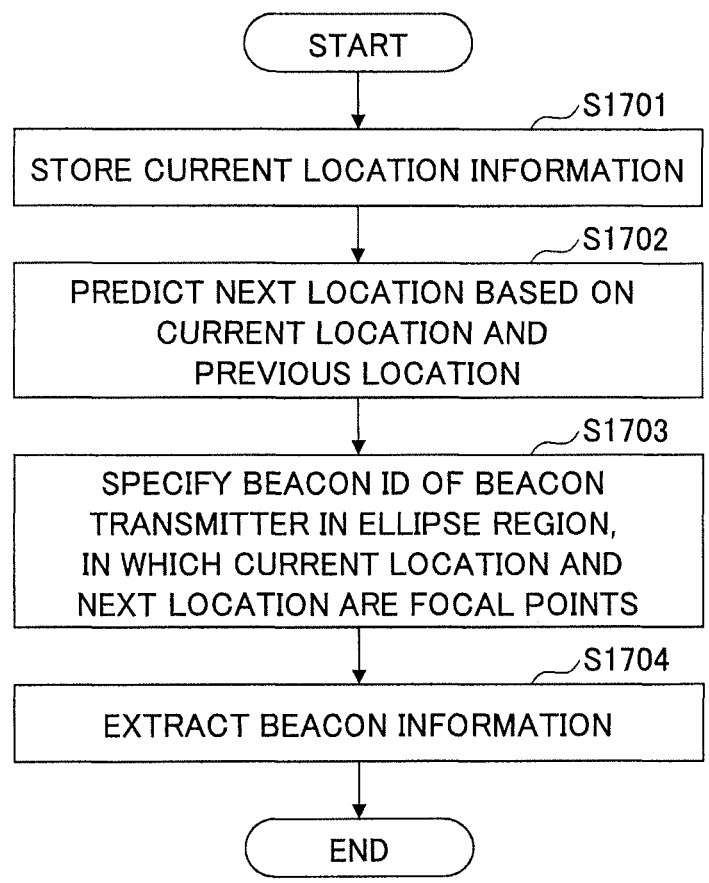
FIG. 17 is a flowchart for explaining an example of an extraction process of the beacon information according to the second embodiment.

Next, details of a process of the sensing system 1 according to the second embodiment will be described. In the following, the extraction process of the beacon information in step S1107 in FIG. 11 will be described with reference to FIG. 17. FIG. 17 is a flowchart for explaining an example of the extraction process of the beacon information according to the second embodiment.

First, the beacon information extraction part 304 stores, by the information management part 302, the location information (the location information indicating the current location of the wearable device 20) received by the communication part 301 in step S1103 in FIG. 11 to the location information storage part 340 (step S1701).

Next, the movement prediction part 306 refers to the location information stored in the location information storage part 340 by the information management part 302, and predicts the location of the wearable device 20 after the predetermined time (for instance, 30 seconds) (step S1702).

That is, the movement prediction part 306 predicts a next location based on the location information indicating the location (a previous location) of the wearable device 20 before the predetermined time and the location information indicating the current location of the wearable device 20.

Next, the beacon information extraction part 304 calculates the elliptical area E where the current location and the next location are set as the focal points. Subsequently, the beacon information extraction part 304 refers to the beacon information storage part 310 through the information management part 302, and specifies the beacon ID of the beacon transmitter 40 within the elliptical area E (step S1703). The beacon ID thus specified is the beacon ID of the extraction subject.

For instance, a predetermined distance may be set as a length of a minor axis of the elliptical area E, and the beacon information extraction part 304 may calculate the elliptical area E. The distance may be determined beforehand based on an installation density of the beacon transmitters 40, an extraction amount of the beacon IDs, a prediction accuracy, and the like.

Also, for example, the beacon information extraction part 304 may specify the beacon ID of the extraction subject based on the priority information and the recordable number similar to the first embodiment from among the beacons IDs of the beacon transmitters 40 within the elliptical area E.

Next, the beacon information extraction part 304 extracts, by the information management part 302, multiple sets of the beacon information with respect to the beacon IDs specified in step S1703 from the beacon information storage part 310 (step S1704).

As described above, the sensing system 1 according to the second embodiment predicts the location of the wearable device 20 after the predetermined time, and extracts the beacon information of the beacon transmitter 40 around the predicted location. Hence, in the sensing system 1 according to the second embodiment, it is possible to store the beacon information depending on a future location of the user U at the wearable device 20 in addition to the beacon information corresponding to the current location of the user U.

Third Embodiment

Next, a third embodiment will be described. In the third embodiment, a moving tendency is calculated based on the movement histories (the histories of the location information) of the wearable device 20 such that the beacon information of the beacon transmitter 40 within an area where the wearable device 20 does not pass is not extracted.

Figure 18:
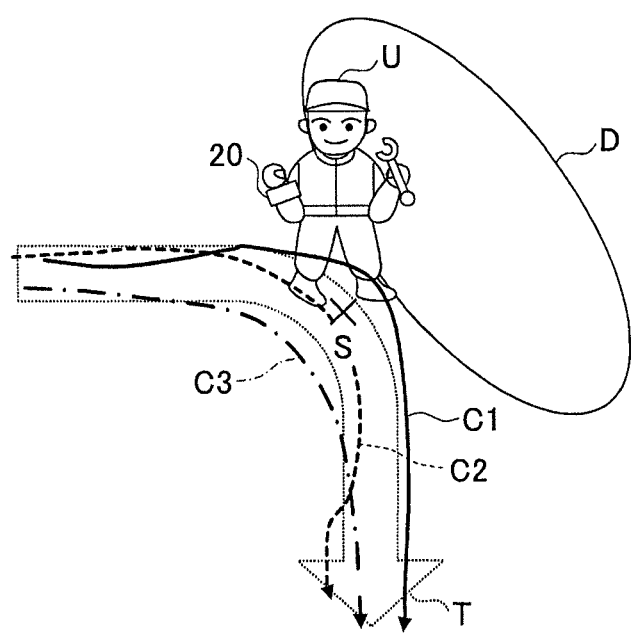
FIG. 18 is a diagram for explaining an extraction of a moving tendency and a non-extraction area.

For instance, as illustrated in FIG. 18, it is assumed that the movement histories of the user U wearing the wearable device 20 includes a "movement history C1", a "movement history C2", and a "movement history C3". In this case, in the third embodiment, for instance, the moving tendency is calculated so as to indicate that the user U turns right around a point S. In addition, in the third embodiment, the beacon information of the beacon transmitters 40, that are located in an area (which is called "a non-extraction area D") where the wearable device 20 is unlikely to pass from a moving tendency T, is not extracted.

By the above described extraction operation, in the sensing system 1 according to the third embodiment, it is possible to reduce an extraction of the beacon information within an area where the user U wearing the wearable device 20 is unlikely to pass. Hence, in the sensing system 1 according to the third embodiment, for instance, it is possible to improve efficiency of the storage capacity of the wearable device 20.

In the third embodiment, differences from the second embodiment will be mainly described. Parts that have substantially the same functions and are substantially the same processes as those described in the first embodiment are given by the same reference numbers, and explanations thereof will be omitted.

Figure 19:
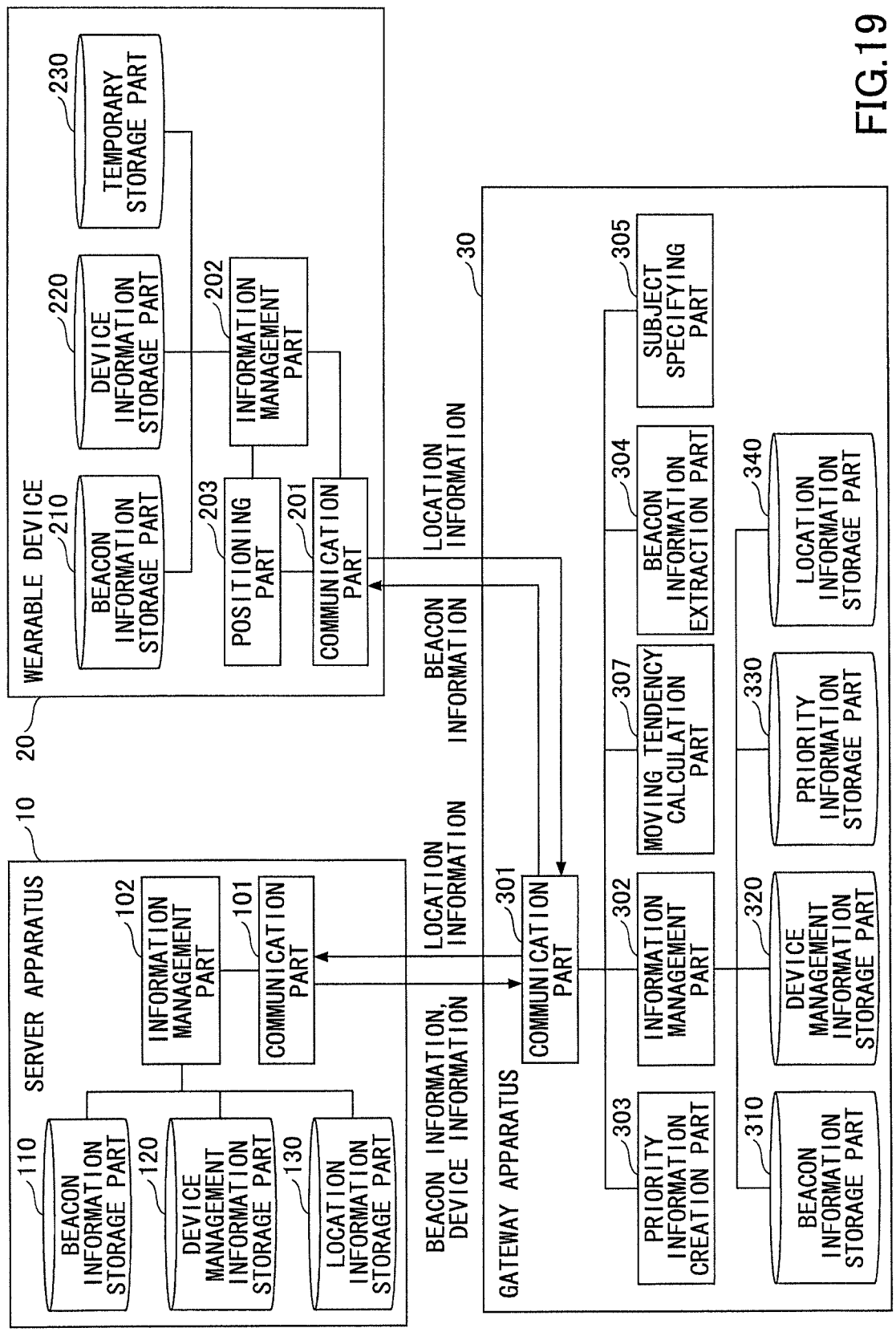
FIG. 19 is a diagram illustrating an example of a functional configuration of a sensing system according to a third embodiment.

First, a functional configuration of the sensing system 1 according to the third embodiment will be described with reference to FIG. 19. FIG. 19 is a diagram illustrating an example of the functional configuration of the sensing system according to the third embodiment.

As illustrated in FIG. 19, the gateway apparatus 30 according to the third embodiment includes a moving tendency calculation part 307. The moving tendency calculation part 307 is realized by a process, which the GW program 300 installed in the gateway apparatus 30 causes the CPU 17 to perform.

The moving tendency calculation part 307 calculates the moving tendency of the wearable device 20 based on the histories of the location information (that is, movement histories) stored in the location information storage part 340.

Figure 20:
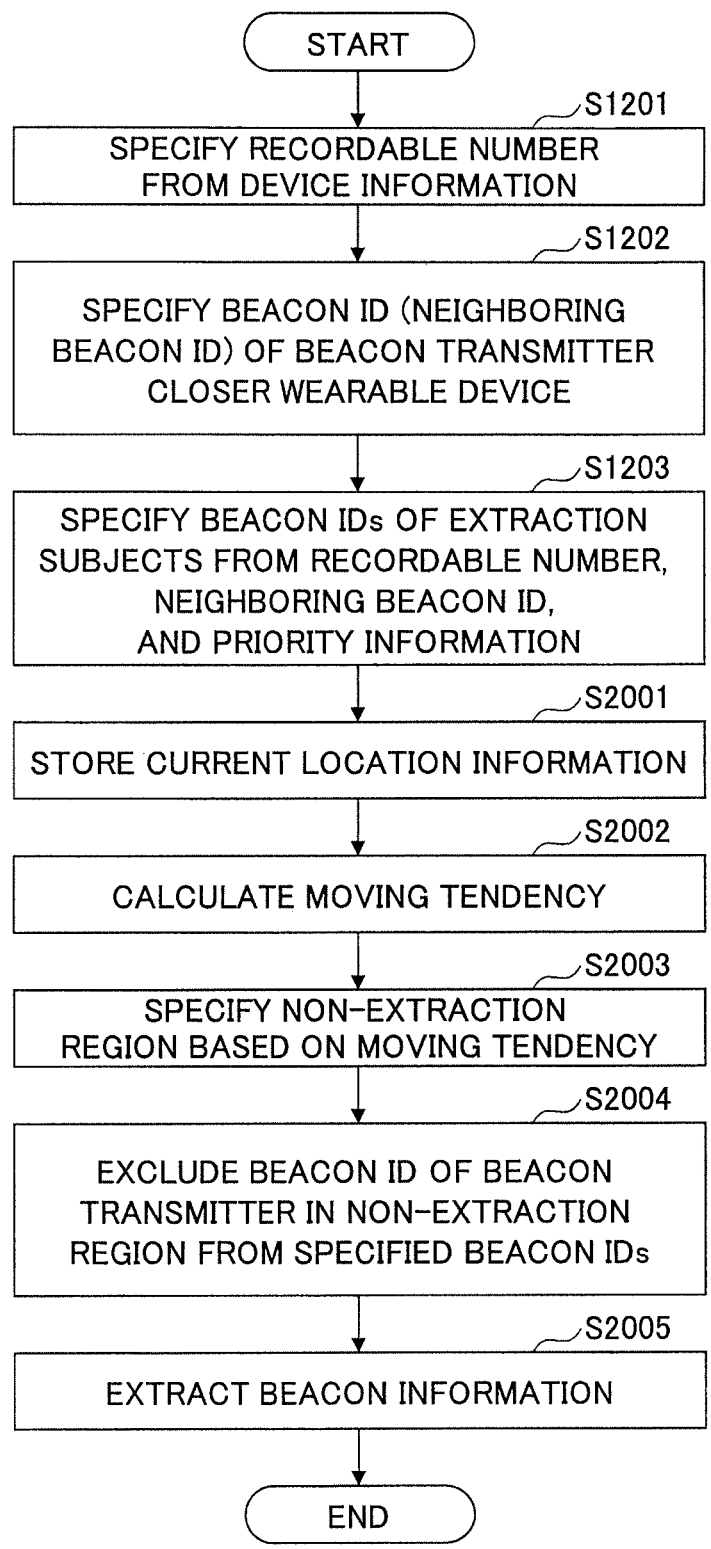
FIG. 20 is a flowchart for explaining an example of an extraction process of beacon information according to the third embodiment.

Next, details of a process of the sensing system 1 according to the third embodiment will be described. In the following, the extraction process of the beacon information in step S1107 in FIG. 11 will be described with reference to FIG. 20. FIG. 20 is a flowchart for explaining an example of the extraction process of the beacon information according to the third embodiment. Processes in step S1201 through step S1203 in FIG. 20 are the same as those in FIG. 12, and explanation thereof will be omitted.

Following step S1203, the beacon information extraction part 304 stores, by the information management part 302, the location information received by the communication part 301 in step S1103 in FIG. 11 to the location information storage part 340 (step S2001).

Next, the moving tendency calculation part 307 refers to the histories of the location information (that is, the movement histories) stored in the location information storage part 340 through the information management part 302, and calculates the moving tendency of the wearable device 20 (step S2002). For instance, the moving tendency calculation part 307 may calculate a frequency for each set of the location information (a frequency of the wearable device 20 passing the location) by using a known statistical method, and calculate the movement histories based on the sets of the location information, which indicates the calculated frequency more than a predetermined value.

Next, the beacon information extraction part 304 specifies the non-extraction area D based on the moving tendency calculated by the moving tendency calculation part 307 (step S2003). For instance, the beacon information extraction part 304 may calculate a probability (a probability of the wearable device 20 passing) for each set of location information based on the moving tendency by using the known statistical method, and may define an area, which includes the location information indicating that the calculated probability is less than or equal to a predetermined value, as the non-extraction area D.

Next, the beacon information extraction part 304 refers to the beacon information storage part 310 through the information management part 302, and specifies the beacon IDs of the beacon transmitters 40 within the non-extraction area D. Then, the beacon information extraction part 304 excludes the beacon IDs of the beacon transmitters 40 within the non-extraction area D from among the beacon IDs of the extraction subjects specified in step S1203 (step S2004).

Next, the beacon information extraction part 304 extracts, by the information management part 302, the beacon information for each of the beacon IDs of the extraction subjects from the beacon information storage part 310 (step S2005).

As described above, the sensing system 1 according to the third embodiment calculates the moving tendency of the wearable device 20, and excludes the beacon ID of the beacon transmitter 40 being in the non-extraction area D where the wearable device 20 is unlikely to pass. By these operations, in the sensing system 1 according to the third embodiment, it is possible to reduce the extraction of the beacon information in the non-extraction area D where the user U wearing the wearable device 20 is unlikely to pass. Hence, for instance, in the sensing system 1 according to the third embodiment, it is possible to improve the efficiency of the storage capacity of the wearable device 20.

Fourth Embodiment

Next, a fourth embodiment will be described. In the fourth embodiment, a case in which a gateway management apparatus 50 for managing the gateway apparatus 30 is included will be described. In the fourth embodiment, differences from the third embodiment will be mainly described. Parts that have substantially the same functions and are substantially the same processes as those described in the first embodiment are given by the same reference numbers, and explanations thereof will be omitted.

Figure 21:
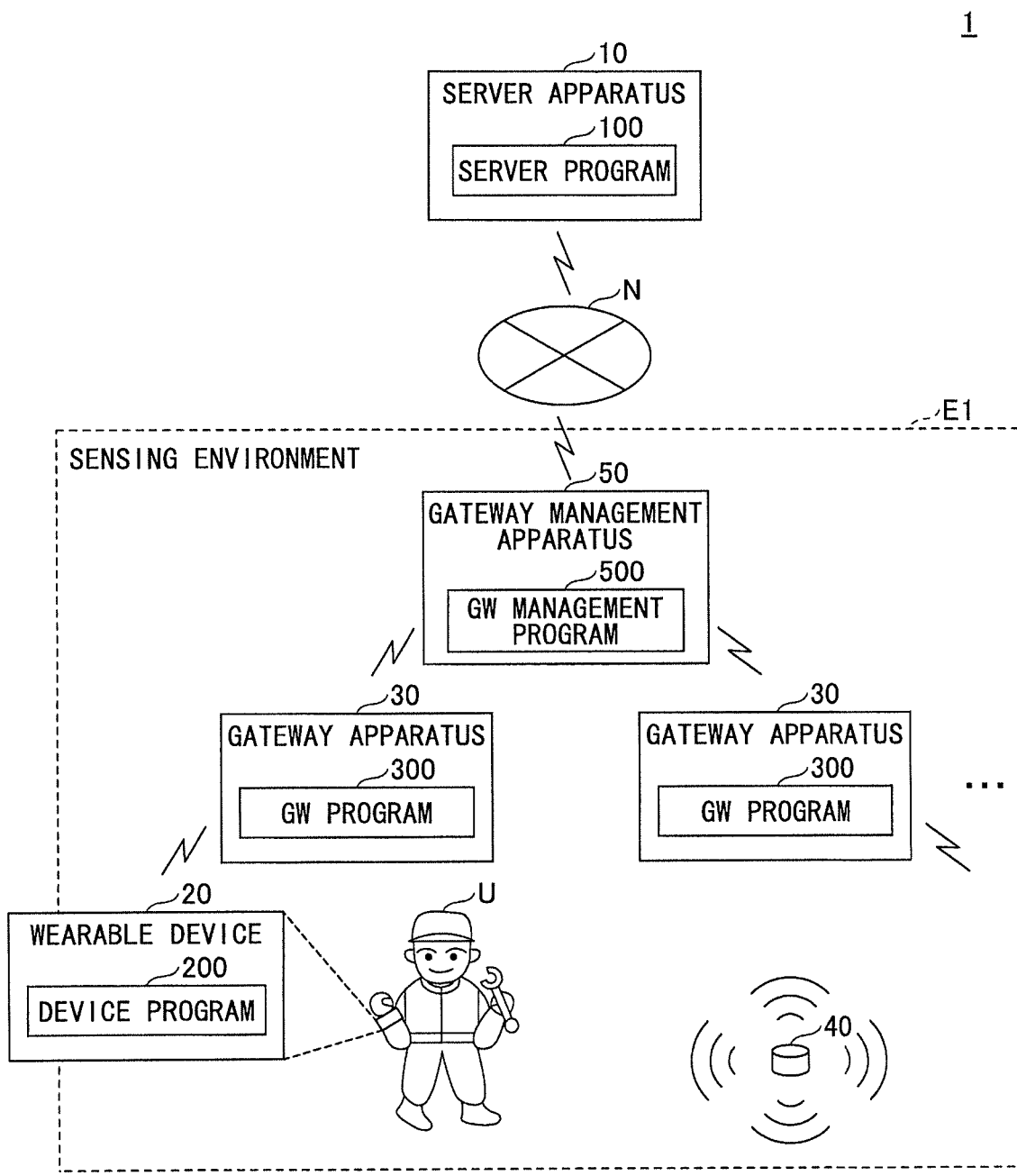
FIG. 21 is a diagram illustrating an example of the entire configuration of a sensing system according to a fourth embodiment.

First, the entire configuration of the sensing system 1 according to the fourth embodiment will be described with reference to FIG. 21. FIG. 21 is a diagram illustrating an example of the entire configuration of the sensing system according to the fourth embodiment.

As illustrated in FIG. 21, the sensing environment E1 of the sensing system 1 according to the fourth embodiment includes the gateway management apparatus 50. The gateway apparatus 30 and the gateway management apparatus 50 are able to be connected to each other via a wireless Local Area Network (LAN) or the like, for instance. Also, the server apparatus 10 and the gateway management apparatus 50 are able to be connected to each other through the network N.

For instance, the gateway management apparatus 50 may be a Personal Computer (PC), a smartphone, a tablet terminal, a network device, and the like. A GW management program 500 is installed into the gateway management apparatus 50.

The gateway management apparatus 50 manages one or more gateway apparatuses 30 included in the sensing environment E1 by the GW management program 500. That is, the gateway management apparatus 50 maintains, by the GW management program 500, the beacon information which the gateway apparatus 30 wrote to the wearable device 20. Hence, it is possible for the gateway apparatus 30 to acquire the beacon information, which each of the wearable devices 20 stores, from the gateway management apparatus 50.

Also, the gateway management apparatus 50 maintains, by the GW management program 500, a number of times of writing beacon information to the wearable device 20. For instance, by this management, it is possible for the gateway apparatus 30 to improve the efficiency of the storage capacity, by deleting the beacon information written to the wearable device 20 fewer times or the like.

A hardware configuration of the gateway management apparatus 50 is the same as that of the gateway apparatus 30, and explanation thereof will be omitted. That is, as illustrated in FIG. 3, the gateway management apparatus 50 also includes an input device 11, a display device 12, an external I/F 13, a communication I/F 14, and a Read Only Memory (ROM) 15. Also, the gateway management apparatus 50 according to the fourth embodiment includes a RAM 16, a CPU 17, and a storage device 18, which are mutually connected via a bus 19.

Figure 22:
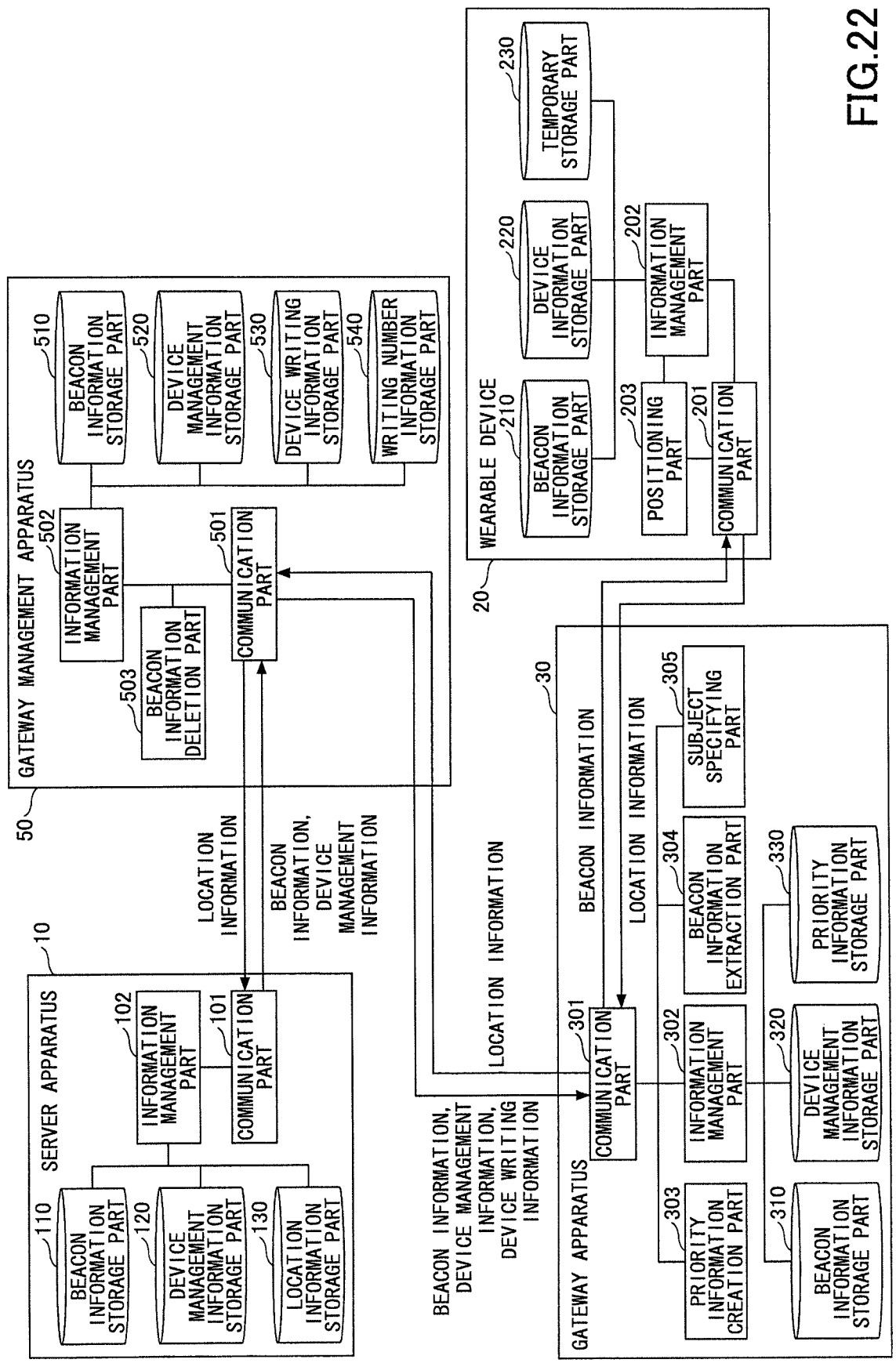
FIG. 22 is a diagram illustrating an example of a functional configuration of the sensing system according to the fourth embodiment.

Next, a functional configuration of the sensing system 1 according to the fourth embodiment will be described with reference to FIG. 22. FIG. 22 is a diagram illustrating an example of the functional configuration of the sensing system 1 according to the fourth embodiment.

As illustrated in FIG. 22, the gateway management apparatus 50 according to the fourth embodiment includes a communication part 501, an information management part 502, and a beacon information deletion part 503. Each of the parts 501 to 503 is realized by processes that the GW management program 500 installed to the gateway management apparatus 50 causes the CPU 17 to perform.

Also, the gateway management apparatus 50 according to the fourth embodiment includes a beacon information storage part 510, a device management information storage part 520, a device writing information storage part 530, and a writing number information storage part 540. These storage parts 510, 520, 530, and 540 may be realized by using a storage device such as a HDD, a SSD, or the like. Alternatively, one or more of these storage parts 510, 520, 530, and 540 may be realized by using a storage device connected to the gateway management apparatus 50 through the network N.

The communication part 501 conducts data communications with the server apparatus 10 through the network N. Also, the communication part 501 conducts data communications with the gateway apparatus 30 by using the wireless LAN or the like, for instance. The communication part 501 may receive the beacon information and the device management information from the server apparatus 10. Also, the communication part 501 may send device writing information to the gateway apparatus 30.

The information management part 502 maintains various information items. That is, the information management part 502 maintains the beacon information stored in the beacon information storage part 510, the device management information stored in the device management information storage part 520, the device writing information stored in the device writing information storage part 530, and writing number information stored in the writing number information storage part 540. The information management part 502 writes information to these storage parts 510, 520, 530, and 540 (including a storing or saving of information, an updating of information being stored in these storage parts 510, 520, 530, and 540, and the like), and reads out the information stored in these storage parts 510, 520, 530, and 540 (including an acquiring or referring of the information stored in these storage parts 510, 520, 530, and 540, and the like).

The beacon information deletion part 503 determines, based on the writing number information stored in the writing number information storage part 540, whether there is beacon information of which a number of times writing to the wearable device 20 is less than or equal to a predetermined value. When it is determined that there is beacon information of which the writing number is less than or equal to the predetermined value, the beacon information deletion part 503 deletes the beacon information from the beacon information storage part 510. In this case, the beacon information deletion part 503 also sends a request of deleting the beacon information to the gateway apparatus 30 so as to delete the beacon information from the gateway apparatus 30.

The beacon information storage part 510 stores the beacon information. The beacon information storage part 510 stores the same sets of the beacon information as those stored in the beacon information storage part 110 of the server apparatus 10.

The device management information storage part 520 stores the device management information. The device management information storage part 520 stores the same sets of the device management information as those stored in the device management information storage part 120 of the server apparatus 10.

The device writing information storage part 530 stores the device writing information. In the following, the device writing information stored in the device writing information storage part 530 will be described with reference to FIG. 23. FIG. 23 is a diagram illustrating an example of the device writing information stored in the device writing information storage part.

As illustrated in FIG. 23, the device writing information stored in the device writing information storage part 530 includes data items of "DEVICE ID", "BEACON ID", and the like.

The "DEVICE ID" indicates identification information for identifying the wearable device 20. The "BEACON ID" indicates the beacon IDs of sets of the beacon information written in the wearable device 20 (that is, the beacon IDs of the beacon information stored in the beacon information storage part 210 of the wearable device 20).

As described above, the device writing information stored in the device writing information storage part 530 includes beacon IDs of the sets of the beacon information written in the wearable device 20 for each of the wearable devices 20.

Referring back to FIG. 22, the writing number information storage part 540 stores the writing number information. In the following, the writing number information stored in the writing number information storage part 540 will be described with reference to FIG. 24. FIG. 24 is a diagram illustrating an example of the writing number information stored in the writing number information storage part.

As illustrated in FIG. 24, the writing number information stored in the writing number information storage part 540 includes data items of "BEACON ID", "WRITING NUMBER", and the like.

The "BEACON ID" indicates the identification information for identifying the beacon information (and the beacon transmitter 40). The "WRITING NUMBER" indicates a number of times writing beacon information to the wearable device 20.

As described above, the device writing information stored in the writing number information storage part 540 includes the writing number indicating the number of times writing the beacon information to the wearable device 20 for each set of beacon information.

Figure 25:
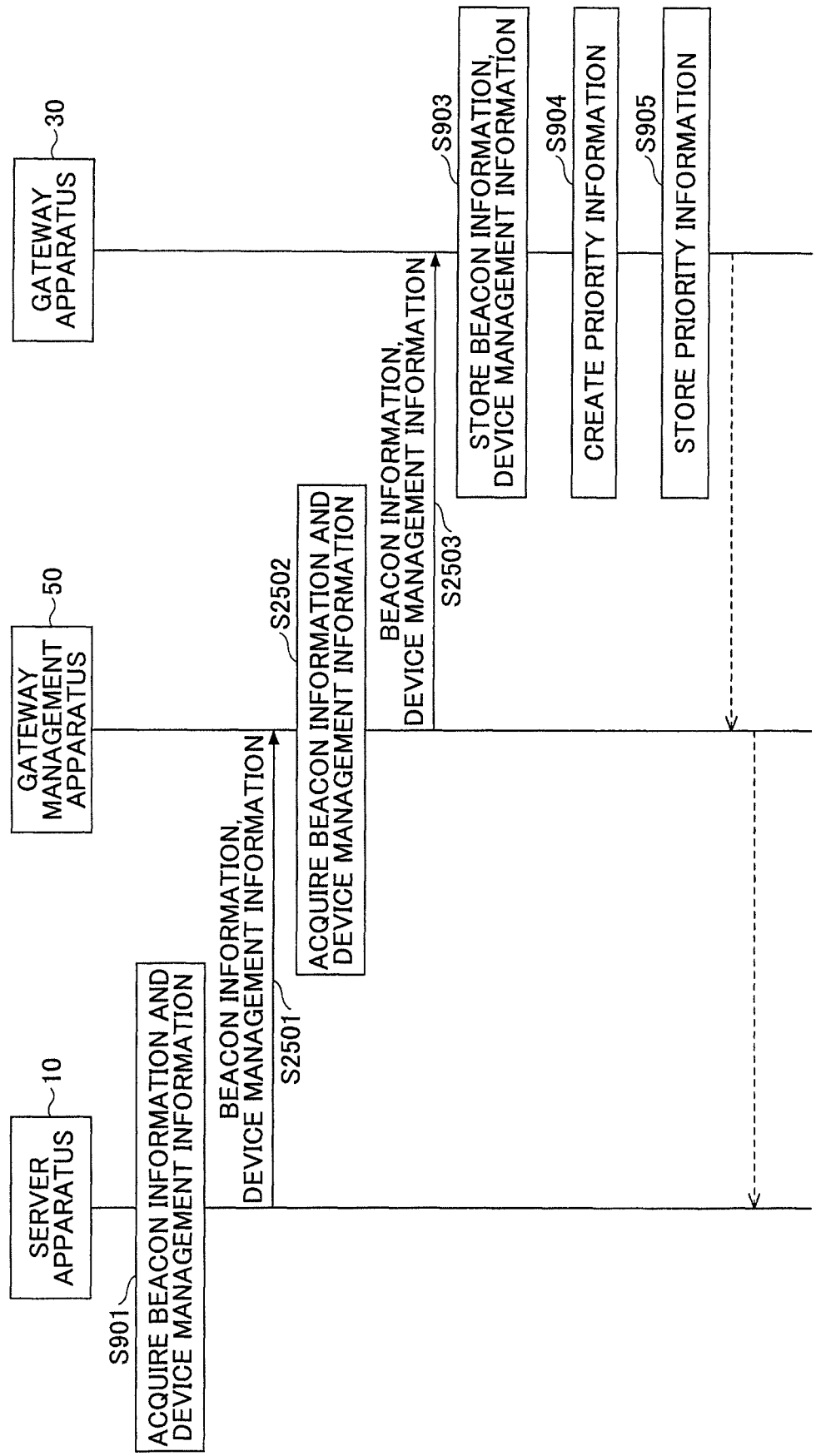
FIG. 25 is a diagram for explaining a sequence example of a process for storing beacon information and device management information according to the fourth embodiment.

Next, details of a process of the sensing system 1 according to the fourth embodiment will be described. First, a process, in which the gateway apparatus 30 and the gateway management apparatus 50 store the beacon information and the device management information sent from the server apparatus 10, will be described with reference to FIG. 25. FIG. 25 is a diagram for explaining a sequence example of the process for storing the beacon information and the device management information according to the fourth embodiment. In FIG. 25, processes of step S901 and step S903 through S905 are the same as those in FIG. 9, and explanation thereof will be omitted.

Following step S901, the communication part 101 of the server apparatus 10 sends the beacon information and the device management information acquired by the information management part 102 to the gateway management apparatus 50 (step S2501).

The information management part 502 of the gateway management apparatus 50 stores the beacon information and the device management information received by the communication part 501 to the beacon information storage part 510 and the device management information storage part 520, respectively (step S2502). Accordingly, the beacon information stored in the beacon information storage part 110 of the server apparatus 10 is stored in the beacon information storage part 510 of the gateway management apparatus 50. In the same manner, the device management information stored in the beacon information storage part 210 of the server apparatus 10 is stored in the device management information storage part 520 of the gateway management apparatus 50.

Next, the communication part 501 of the gateway management apparatus 50 sends the beacon information stored in the beacon information storage part 510 and the device management information stored in the device management information storage part 520 to the gateway apparatus 30 (step S2503).

Hence, the beacon information stored in the beacon information storage part 510 of the gateway management apparatus 50 is stored in the beacon information storage part 310 of the gateway apparatus 30. In the same manner, the device management information stored in the device management information storage part 520 of the gateway management apparatus 50 is stored in the device management information storage part 320 of the gateway apparatus 30.

Figure 26:
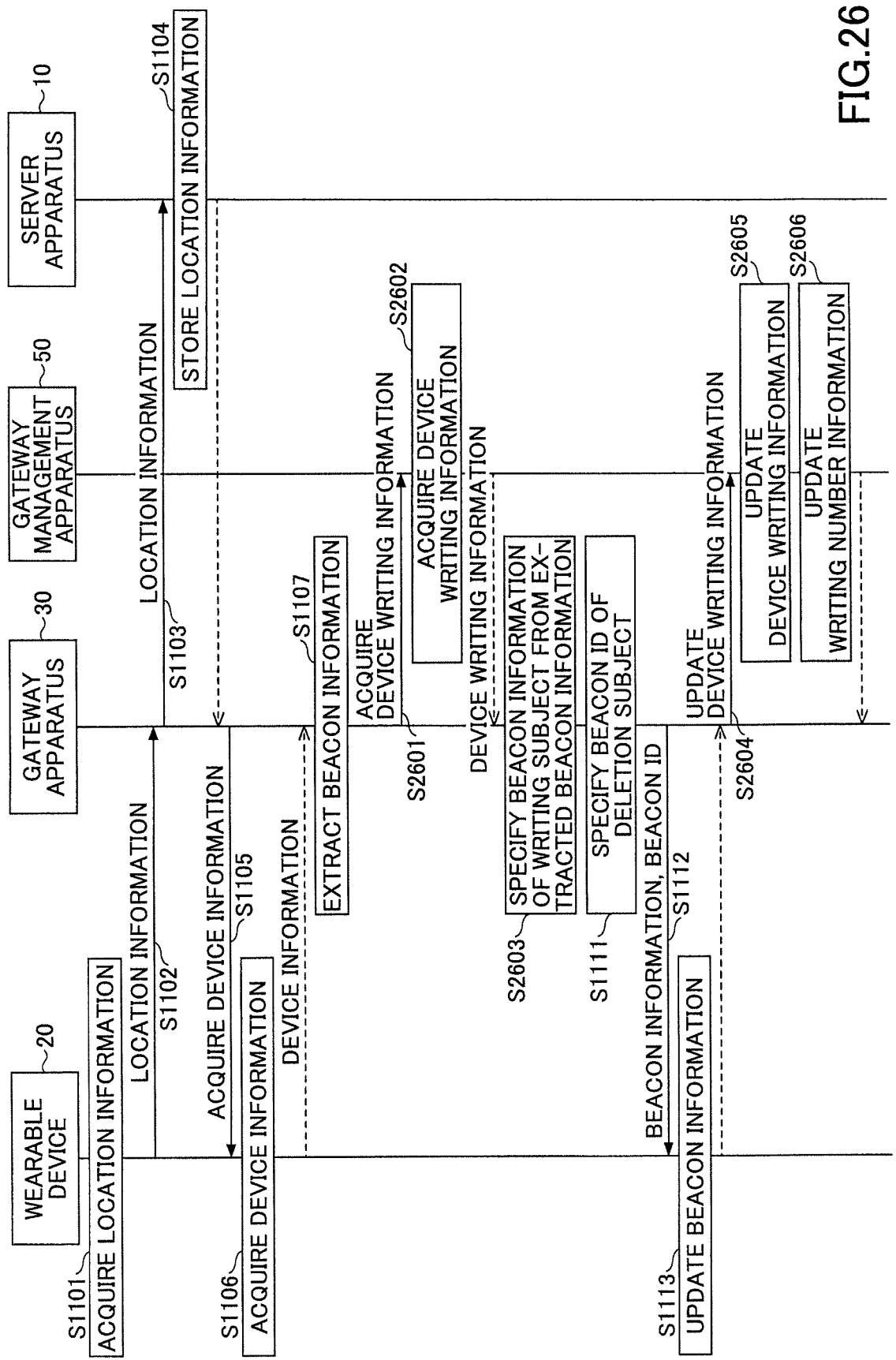
FIG. 26 is a diagram for explaining a sequence example of an update process for the beacon information according to the fourth embodiment.

Next, depending on the location of the wearable device 20, an update process of the beacon information stored in the wearable device 20 will be described with reference to FIG. 26. FIG. 26 is a diagram for explaining a sequence example of the update process for the beacon information according to the fourth embodiment. Processes in steps S1101 through step S1107 and step S1111 through step S1113 in FIG. 26 are the same as those in FIG. 11, and explanation thereof will be omitted.

Following step S1107, the subject specifying part 305 of the gateway apparatus 30 sends an acquisition request of the device writing information to the gateway management apparatus 50 by the communication part 301 (step S2601). For instance, the acquisition request of the device writing information may indicate the device ID of the wearable device 20 and the like.

When the communication part 501 receives the acquisition request, the information management part 502 of the gateway management apparatus 50 acquires the device writing information of the device ID indicated by the acquisition request from the device writing information storage part 530 (step S2602). The information management part 502 sends back the device writing information to the gateway apparatus 30 by the communication part 501.

When the communication part 301 receives the device writing information, the subject specifying part 305 of the gateway apparatus 30 specifies the beacon information of the writing subject from among sets of the beacon information extracted by the beacon information extraction part 304 (step S2603).

That is, the subject specifying part 305 specifies the beacon information other than the beacon information of the beacon ID indicated in the device writing information from among the sets of beacon information extracted by the beacon information extraction part 304. That is, the subject specifying part 305 specifies the beacon information not being stored in the beacon information storage part 210 of the wearable device 20 (which is called "not-written beacon information") among the sets of the beacon information extracted by the beacon information extraction part 304.

Also, following step S1113, the subject specifying part 305 of the gateway apparatus 30 sends an update request of the device writing information to the gateway management apparatus 50 by the communication part 301 (step S2604). For instance, the update request of the device writing information may indicate the device ID of the wearable device 20, and the beacon ID of the beacon information extracted by the beacon information extraction part 304.

When the communication part 501 receives the update request of the beacon writing information, the information management part 502 of the gateway management apparatus 50 updates the device writing information stored in the device writing information storage part 530 (step S2605). That is, the information management part 502 updates the beacon ID in the device writing information of the device ID indicated by the update request with the beacon ID indicated by the update request.

For instance, the update request of the beacon writing information may include a device ID "D001" and the beacon IDs "B003, B017, B018, . . . ". In this case, the information management part 502 updates the beacon IDs in the device writing information of the device ID "D001" to "B003, B017, B018, . . . ".

Next, the information management part 502 of the gateway management apparatus 50 updates the writing number information stored in the writing number information storage part 540 (step S2606). That is, the information management part 502 adds "1" to the writing number in the writing number information of the beacon ID indicated by the update request of the beacon writing information.

The update request of the beacon writing information may indicate the beacon IDs "B003, B017, B018, . . . ". In this case, the information management part 502 adds "1" to the writing number in the writing number information of the beacon ID "B003". In the same manner, the information management part 502 adds "1" to the writing number in the writing number information of the beacon ID "B018".

As described above, in the sensing system 1 according to the fourth embodiment, the gateway management apparatus 50 maintains the beacon information stored in the wearable device 20. Hence, in the sensing system 1 according to the fourth embodiment, it is possible to reduce workload of communications between the wearable device 20 and the gateway apparatus 30. For instance, in a case in which the communications between the wearable device 20 and the gateway apparatus 30 are conducted by the BLE and the communications between gateway apparatus 30 and the gateway management apparatus 50 are conducted by wireless LAN, it is possible to reduce a process time of the entire sensing system 1.

Figure 27:
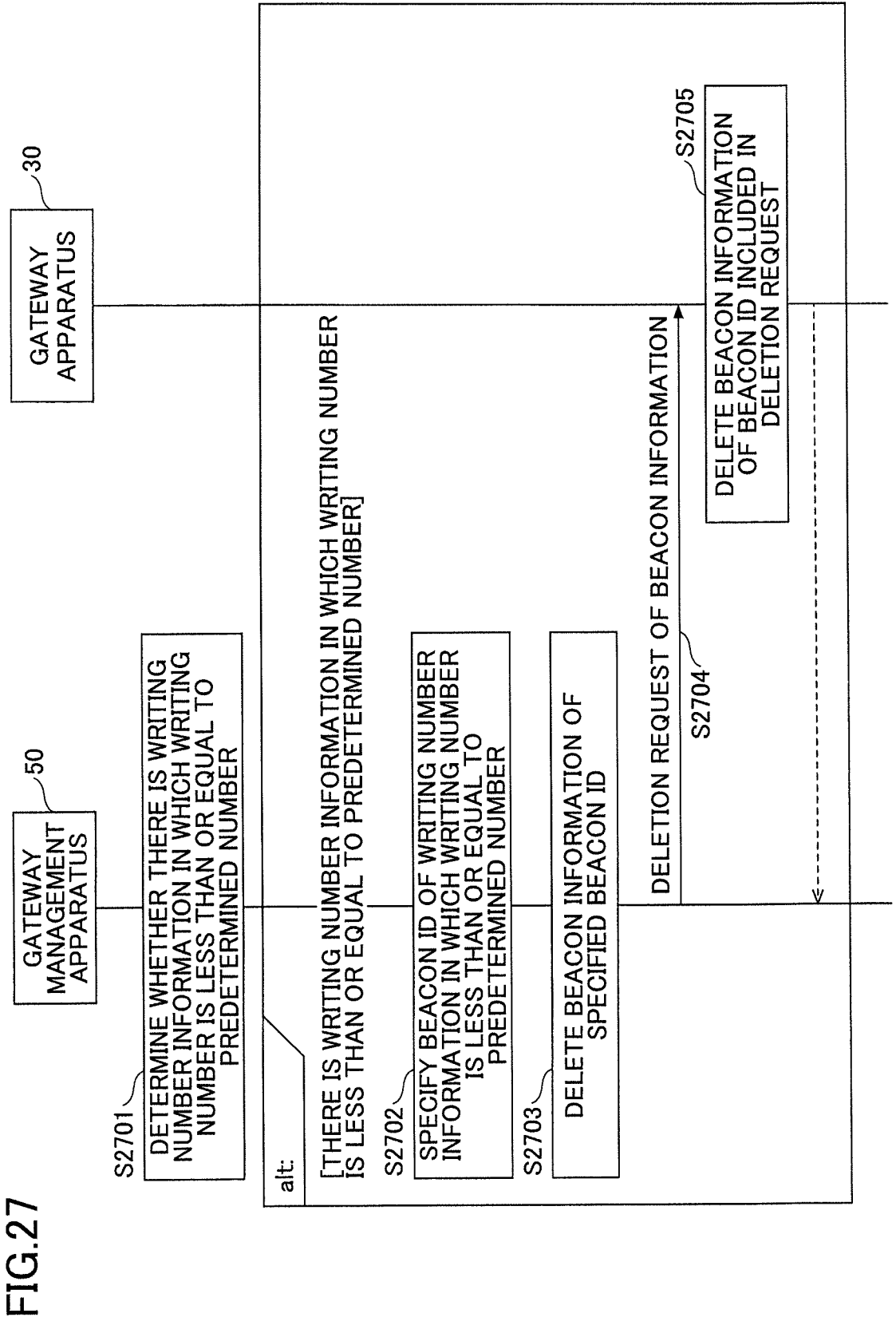
FIG. 27 is a diagram for explaining a sequence example of a deletion process of the beacon information according to the fourth embodiment.

Next, a deletion process of the beacon information, of which the number of times writing to the wearable device 20 is less than or equal to a predetermined number, will be described with reference to FIG. 27. FIG. 27 is a diagram for explaining a sequence example of the deletion process of the beacon information according to the fourth embodiment.

First, the beacon information deletion part 503 of the gateway management apparatus 50 refers to the writing number information storage part 540 by the information management part 502, and determines whether there is the writing number information in which the writing number is less than or equal to the predetermined number (step S2701). The beacon information deletion part 503 may determine whether the writing number is less than or equal to the predetermined number, at intervals of a predetermined time (for instance, 1 week).

In step S2701, when determining that there is no writing number information in which the writing number is less than or equal to the predetermined number, the gateway management apparatus 50 terminates this deletion process.

However, in step S2701, when determining that there is the writing number information in which the writing number is less than or equal to the predetermined number, the gateway management apparatus 50 of the beacon information deletion part 503 specifies the beacon ID indicated by the writing number information in which the writing number is less than or equal to the predetermined number (step S2702).

Next, the beacon information deletion part 503 of the gateway management apparatus 50 deletes the beacon information of the beacon ID specified in step S2702 from the beacon information storage part 510 (step S2703).

Next, the beacon information deletion part 503 of the gateway management apparatus 50 sends a deletion request of the beacon information by the communication part 501 to the gateway apparatus 30 (step S2704). The deletion request of the beacon information includes the beacon ID specified in step S2702.

When receiving the deletion request of the beacon information by the communication part 301, the information management part 302 of the gateway apparatus 30 deletes the beacon information of the beacon ID indicated by the deletion request from the beacon information storage part 310 (step S2705).

As described above, in the sensing system 1 according to the fourth embodiment, the beacon information, in which the writing number of writing to the wearable device 20 is less than or equal to the predetermined number, is deleted from the gateway apparatus 30 and the gateway management apparatus 50. Hence, in the sensing system 1 according to the fourth embodiment, it is possible to raise efficiency of storage capacities the gateway apparatus 30 and the gateway management apparatus 50.

Fifth Embodiment

Next, a fifth embodiment will be described. In the fifth embodiment, the gateway apparatus 30 is not included. In the fifth embodiment, differences from the first embodiment will be mainly described. Parts that have substantially the same functions and are substantially the same processes as those described in the first embodiment are given by the same reference numbers, and explanations thereof will be omitted.

Figure 28:
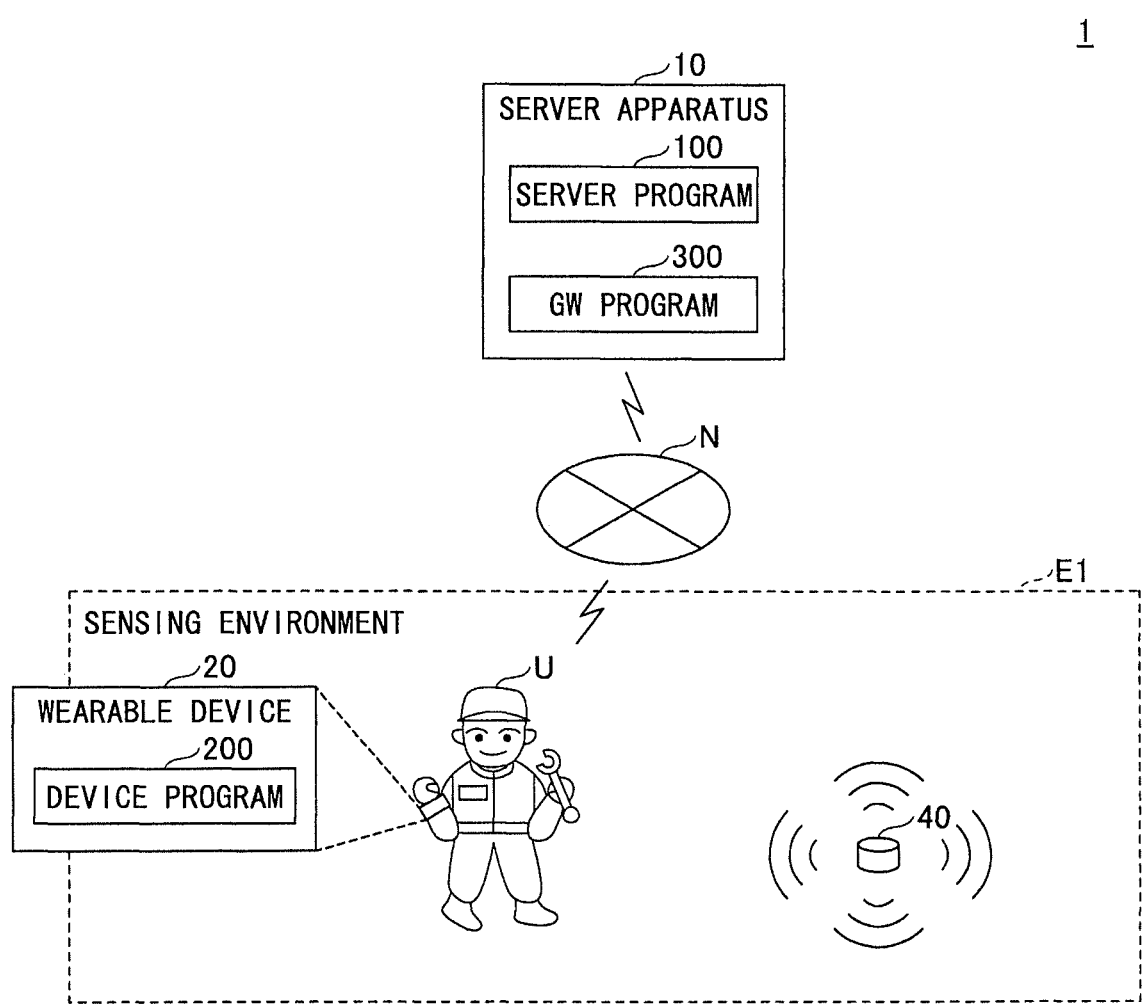
FIG. 28 is a diagram illustrating an example of the entire configuration of a sensing system according to a fifth embodiment.

The entire configuration of the sensing system 1 according to the fifth embodiment will be described with reference to FIG. 28. FIG. 28 is a diagram illustrating an example of the entire configuration of the sensing system according to the fifth embodiment.

As illustrated in FIG. 28, the sensing system 1 according to the fifth embodiment includes a server apparatus 10 in which the GW program 300 is installed. In addition, the server apparatus 10 and the wearable device 20 are able to be connected to each other through the network N.

As described above, in a case in which the wearable device 20 and the server apparatus 10 are able to be directly connected to each other, the GW program 300 for realizing the functions of the gateway apparatus 30 may be installed to the server apparatus 10. Hence, in the sensing system 1 according to the fifth embodiment, the gateway apparatus 30 is not needed to be arranged in the sensing environment E1.

According to any of the first through the fifth embodiments, as an example, the wearable device 20 conducts a sensing of the radio signal transmitted from the beacon transmitter 40, and the location information indicating a location measured by the wearable device 20 is generated as sensing information. However, each of the first through the fifth embodiments is not limited to this configuration. Alternatively, any of the first through the fifth embodiments may be applied to a case in which the wearable device 20 is sensing a neighboring radio signal state, various processes using information stored in the wearable device 20 are conducted, and the sensing information is generated.

For example, each of the first through the fifth embodiments may be applied to a case in which the wearable device 20 is sensing neighboring parameters (such as temperature, a body temperature, a heart rate, and the like of the user U), and conducts a risk degree determination process with respect to a heat stroke using a threshold of the parameters stored by the wearable device 20. In this case, in the sensing system 1 according to each of the first through the fifth embodiments, depending on the location of the wearable device 20 detected by a positioning of a Global Positioning System (GPS) receiver, a threshold for each of the parameters stored in the wearable device 20 may be dynamically updated. The threshold for each of the parameters is an example of the neighboring definition information.

Moreover, in the server apparatus 10 and the gateway apparatus 30, the ROM 15, the RAM 16, and the storage device 18 may be collectively referred to as a first memory, and the CPU 17 may be referred to as a first processor. In the wearable device 20, the ROM 22, the RAM 23, and the storage device 25 may be collectively referred to as a second memory, and the CPU 24 may be referred to as a second processor.

Furthermore, the server apparatus 10 and the gateway apparatus 30 may be realized in an information processing apparatus.

According to the above described first through fifth embodiments, it is possible to generate the sensing information depending on the location with high accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
a device that conducts a positioning process measuring a position by sensing a neighboring radio signal state; and
an information processing apparatus that is connected to the device,
wherein the information processing apparatus includes
a first memory, and
a first processor coupled to the first memory and the first processor configured to
store, in a first storage area in the first memory, multiple sets of neighboring definition information of which a neighboring radio signal state is defined by beacon information including beacon identification information for identifying a neighboring beacon transmitter around the device, and location information indicating a location of the neighboring beacon transmitter,
store, in a second storage area in the first memory, the beacon identification information, other sets of the beacon identification information different from the beacon identification information, and a priority of the other sets of the beacon identification information, in which the other sets of the beacon identification information and the priority are associated with the beacon identification information, and the priority indicates an order in which the neighboring beacon transmitter is closer to a position of the device,
specify, based on the location information and the beacon identification information received from the device, first sets of the beacon information including the beacon identification information being received, and second sets of the beacon information including one or more of the other sets of the beacon identification information, the second sets of the beacon information being associated with the beacon identification information and stored in the second storage area in the first memory and having the priority more than or equal to a predetermined level, from among the multiple sets of the beacon information of the multiple sets of neighboring definition information stored in the first storage area, and send neighboring definition information including the first sets of the beacon information and the second sets of the beacon information, to the device, and wherein the device includes a second memory, and a second processor coupled to the second memory and the second processor configured to:

conduct the positioning process using the neighboring definition information received from the information processing apparatus and the beacon identification information included in a beacon signal transmitted from the neighboring beacon transmitter around the device, the beacon signal acquired by the sensing, and generate sensing information indicating the position of the device measured by the positioning process.

2. The information processing system as claimed in claim 1, wherein the second processor is further configured to send the generated sensing information to the information processing apparatus.

3. The information processing system as claimed in claim 1, wherein the specifying of the neighboring definition information specifies third sets of the beacon information including the received beacon identification information and fourth sets of the beacon information depending on the location of the beacon transmitter indicated by the beacon information, from among the multiple sets of the beacon information stored in the first memory, based on the location information and the beacon identification information received from the device.

4. An information processing apparatus connected to a device that conducts a positioning process measuring a position by sensing a neighboring radio signal state, the information processing apparatus comprising:

a memory, and a processor coupled to the memory and the processor configured to store, in a first storage area in the memory, multiple sets of neighboring definition information of which a neighboring radio signal state is defined by beacon information including beacon identification information for identifying a neighboring beacon transmitter around the device, and location information indicating a location of the neighboring beacon transmitter, store, in a second storage area in the memory, the beacon identification information, other sets of the beacon identification information different from the beacon identification information, and a priority of the other sets of the beacon identification information, in which the other sets of the beacon identification information and the priority are associated with the beacon identification information, and the priority indicates an order in which the neighboring beacon transmitter is closer to a position of the device, specify, based on the location information and the beacon identification information received from the device, first sets of the beacon information including the beacon identification information being received, and second sets of the beacon information including one or more of the other sets of the beacon identification information, the second sets of the beacon information being associated with the beacon identification information and stored in the second storage area in the first memory and having the priority more than or equal to a predetermined level, from among the multiple sets of the beacon information of the multiple sets of neighboring definition information stored in the first storage area, and send neighboring definition information including the first sets of the beacon information and the second sets of the beacon information, to the device.

5. The information processing apparatus as claimed in claim 4, wherein the specifying of the neighboring definition information specifies third sets of the beacon information including the received beacon identification information and fourth sets of the beacon information depending on the location of the beacon transmitter indicated by the beacon information, from among the multiple sets of the beacon information stored in the memory, based on the location information and the beacon identification information received from the device.

6. An information processing method by a computer connected to a device that conducts a positioning process measuring a position by sensing a neighboring radio signal state, the information processing method comprising:

storing, in a first storage area in a memory, multiple sets of neighboring definition information of which a neighboring radio signal state is defined by beacon information including beacon identification information for identifying a neighboring beacon transmitter around the device, and location information indicating a location of the neighboring beacon transmitter;

storing, in a second storage area in the first memory, the beacon identification information, other sets of the beacon identification information different from the beacon identification information, and a priority of the other sets of the beacon identification information, in which the other sets of the beacon identification information and the priority are associated with the beacon identification information, and the priority indicates an order in which the neighboring beacon transmitter is closer to a position of the device;

specifying, based on the location information and the beacon identification information received from the device, first sets of the beacon information including the beacon identification information being received, and second sets of the beacon information including one or more of the other sets of the beacon identification information, the second sets of the beacon information being associated with the beacon identification information and stored in the second storage area in the first memory and having the priority more than or equal to a predetermined level, from among the multiple sets of the beacon information of the multiple sets of neighboring definition information stored in the first storage area, and sending neighboring definition information including the first sets of the beacon information and the second sets of the beacon information, to the device.

7. The information processing method as claimed in claim 6, wherein the specifying of the neighboring definition information specifies third sets of the beacon information including the received beacon identification information and fourth sets of the beacon information depending on the location of the beacon transmitter indicated by the beacon information, from among the multiple sets of the beacon information stored in the memory, based on the location information and the beacon identification information received from the device.

* * * * *